(12) United States Patent
Adamson et al.

(10) Patent No.: US 12,525,656 B2
(45) Date of Patent: Jan. 13, 2026

(54) TERMINAL ASSEMBLY AND BATTERY FRAME MEMBER FOR RECHARGEABLE BATTERY

(71) Applicant: Eos Energy Technology Holdings, LLC, Edison, NJ (US)

(72) Inventors: George W. Adamson, Princeton Junction, NJ (US); Sara S. Bowers, Edison, NJ (US); Francis W. Richey, Edison, NJ (US); Daniel Friberg, Edison, NJ (US); Fabian Bruegger, Edison, NJ (US); Mateo S. Williams, Edison, NJ (US)

(73) Assignee: Eos Energy Technology Holdings, LLC, Edison, NJ (US)

( * ) Notice: Subject to any disclaimer, the term of this patent is extended or adjusted under 35 U.S.C. 154(b) by 0 days.

(21) Appl. No.: 18/523,010

(22) Filed: Nov. 29, 2023

(65) Prior Publication Data

US 2024/0097205 A1    Mar. 21, 2024

Related U.S. Application Data

(63) Continuation of application No. 17/410,552, filed on Aug. 24, 2021, now Pat. No. 11,876,187.
(Continued)

(51) Int. Cl.
*H01M 10/36* (2010.01)
*H01M 10/04* (2006.01)
(Continued)

(52) U.S. Cl.
CPC ..... *H01M 10/365* (2013.01); *H01M 10/0418* (2013.01); *H01M 10/044* (2013.01);
(Continued)

(58) Field of Classification Search
CPC ............ H01M 10/365; H01M 10/0413; H01M 10/0418; H01M 10/044; H01M 10/0585;
(Continued)

(56) References Cited

U.S. PATENT DOCUMENTS 4,169,816 A    10/1979 Tsien
5,264,305 A    11/1993 Charkey
(Continued)

FOREIGN PATENT DOCUMENTS

EP    2613393 A1 *  7/2013   ........ H01M 10/0418
FR    3073323 A1    5/2019
(Continued)

OTHER PUBLICATIONS

International Search Report and Written Opinion for Application No. PCT/US21/47359 dated Dec. 21, 2021.
(Continued)

*Primary Examiner* — Kiran Quraishi Akhtar
(74) *Attorney, Agent, or Firm* — Botos Churchill IP Law LLP

(57) ABSTRACT

Provided is a terminal assembly for an electrochemical battery comprising a terminal connector; a conductive flat-plate with an electrically conducting perimeter; an electrically insulating tape member; and a terminal bipolar electrode plate. The electrically insulating tape member is in between the conductive flat-plate and the terminal bipolar electrode plate such that the electrically insulating tape member does not cover the entire surface area of the conductive flat-plate. The electrically conducting perimeter enables bi-directional uniform current flow through the conductive flat-plate between the terminal connector and the terminal bipolar electrode plate. Also provided is a battery frame member for a static rechargeable battery comprising a liquid diversion system; a gutter; a sealing member; a gas
(Continued)

channel; and a ventilation hole. Also provided is a static rechargeable electrochemical battery comprising a pair of terminal assemblies, at least one bipolar electrode interposed between the pair of terminal assemblies, and a battery frame member.

12 Claims, 14 Drawing Sheets

Related U.S. Application Data

(60) Provisional application No. 62/706,608, filed on Aug. 28, 2020.

(51) Int. Cl.
*H01M 10/0585* (2010.01)
*H01M 50/183* (2021.01)
*H01M 50/209* (2021.01)
*H01M 50/308* (2021.01)
*H01M 50/543* (2021.01)

(52) U.S. Cl.
CPC ..... *H01M 10/0585* (2013.01); *H01M 50/183* (2021.01); *H01M 50/209* (2021.01); *H01M 50/308* (2021.01); *H01M 50/543* (2021.01)

(58) Field of Classification Search
CPC .......... H01M 50/183; H01M 50/209; H01M 50/308; H01M 4/96; H01M 12/02; H01M 12/085; H01M 50/543; H01M 50/1385; H01M 2004/029; H01M 2004/8694; H01M 2300/0002; Y02E 60/10; Y02P 70/50
See application file for complete search history.

(56) References Cited

U.S. PATENT DOCUMENTS

| 5,308,718 | A | 5/1994 | Eidler et al. |
|---|---|---|---|
| 5,591,538 | A | 1/1997 | Eidler et al. |
| 10,305,111 | B2 | 5/2019 | Adamson et al. |
| 2010/0052692 | A1 | 3/2010 | Yano et al. |
| 2013/0045399 | A1* | 2/2013 | Cole ............... H01M 10/365 429/70 |
| 2013/0122333 | A1 | 5/2013 | Obika et al. |
| 2015/0125768 | A1 | 5/2015 | Mosso et al. |
| 2016/0197373 | A1 | 7/2016 | Shaffer et al. |
| 2019/0260034 | A1* | 8/2019 | Okuda ............ H01M 10/0585 |
| 2021/0296630 | A1 | 9/2021 | Akutsu et al. |
| 2022/0320514 | A1 | 10/2022 | Smith |

FOREIGN PATENT DOCUMENTS

| JP | H05101843 | A | 4/1993 |
|---|---|---|---|
| JP | 2014067620 | A | 4/2014 |
| JP | 2017535932 | A | 11/2017 |
| JP | 2018125142 | A | 8/2018 |
| JP | 2020030982 | A | 2/2020 |
| JP | 2020031023 | A | 2/2020 |
| JP | 2020077553 | A | 5/2020 |
| KR | 20170057440 | A | 5/2017 |
| WO | 2016057477 | A1 | 4/2016 |
| WO | 2016057489 | A1 | 4/2016 |
| WO | 2019040683 | A1 | 2/2019 |
| WO | 2019092375 | A2 | 5/2019 |

OTHER PUBLICATIONS

Machine translation of WO-2019092375-A2 (Year: 2019).
EOS Energy Enterprises, Inc, 2021 Annual Shareholder Meeting Agenda and Presentation, Jun. 15, 2021; www.virtualshareholdermeeting.com/EOSE2021, pp. 14.
International Preliminary Report issued in PCT application No. PCT/US2021/047359 on Feb. 28, 2023, pp. 5.
Extended European Search Report for Application No. EP21862575 dated Jan. 17, 2025, 8 pgs.
Notice of Reasons for Rejection issued in Japanese application No. 2023-514059 on Aug. 12, 2025, pp. 8.
Office Action issued in Israeli Application No. 300897 on Aug. 19, 2025, pp. 4.

* cited by examiner

TERMINAL ASSEMBLY AND BATTERY FRAME MEMBER FOR RECHARGEABLE BATTERY

CROSS-REFERENCE TO RELATED APPLICATIONS

This application is a continuation of U.S. application Ser. No. 17/410,552, filed Aug. 24, 2021, which claims the benefit of U.S. Provisional Application No. 62/706,608, filed Aug. 28, 2020, the contents of all of which are incorporated by reference herein in their entirety.

TECHNICAL FIELD

Described herein is an assembly for rechargeable battery. Specifically, this disclosure relates to a terminal assembly for rechargeable battery (e.g., zinc-halide batteries) that generates a substantially uniform current flow to and from the storage battery during battery charging and discharging. This disclosure also relates to battery frame members for rechargeable batteries wherein the electrolyte remains sequestered in each battery cell throughout battery cycling and is not circulated between a reservoir and a reaction chamber during battery operation.

BACKGROUND

Zinc-halide batteries were developed as devices for storing electrical energy. Traditional zinc-halide batteries (e.g., zinc-bromine batteries) employed bipolar electrodes disposed in a static, i.e., non-flowing, zinc-bromide aqueous solution. The process of charging and discharging electrical current in a zinc-halide battery is generally achieved through a reaction of redox couples like $Zn^{2+}/Zn(s)$ and $X^-/X_2$ in zinc halide electrolyte. When the battery is charged with electrical current, the following chemical reactions occur:

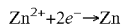
$Zn^{2+}+2e^-\rightarrow Zn$

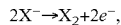
$2X^-\rightarrow X_2+2e^-$, wherein X is a halogen (e.g., Cl, Br, or I). Conversely, when the battery discharges electrical current, the following chemical reactions occur:

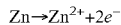
$Zn\rightarrow Zn^{2+}+2e^-$

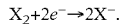
$X_2+2e^-\rightarrow 2X^-$.

These zinc-halide storage batteries were formed in a bipolar electrochemical cell stack, wherein each electrode comprises two poles, such that the anodic reaction occurs on one side of the electrode, and the cathodic reaction occurs on the opposite side of the same electrode. In this vein, bipolar electrodes were often configured as plates, and the cell stack was assembled to form a prismatic geometry. During charging and discharging of the bipolar battery, the electrode plates function as conductors for adjacent cells, i.e., each electrode plate serves as the anode for one cell and the cathode for the adjacent cell. In this prismatic battery geometry, the entire surface area of the electrode plate that separates adjacent electrochemical cells transfers current from cell to cell.

Accordingly, when a traditional bipolar zinc-halide battery charges, zinc metal electrolytically plates on the anode side of the bipolar electrode plate, while molecular halogen species form at the cathode side of the electrode plate. And, when the battery discharges, the plated zinc metal is oxidized to free electrons that are conducted through the electrode plate and reduce the molecular halogen species to generate halide anions.

However, battery performance of traditional zinc-halide batteries is severely limited due to uneven zinc plating on the bipolar electrode during charging. Uneven or irregular zinc plating on the bipolar electrode generates zinc dendrites in the battery and reduces battery capacity and cycle life. Moreover, uneven zinc plating creates heterogeneity in battery discharge currents that negatively affects battery performance as a storage device for electrical energy.

Battery frame assemblies and frame members are used to support battery electrodes and electrolyte and form a portion of the mechanical design of a battery. A frame member comprises a frame, often rectangular in shape, with an open inner space for positioning electrodes and filling with electrolyte. Frame assemblies may also include seals, such as O-rings, to provide a liquid-tight seal between adjacent frames. Frame assemblies should preferably provide one or more advantages, such as being low cost, being easy to manufacture, contributing to the safety of the battery, contributing to the ease of operation of the battery, and contributing to the performance of the battery. A battery frame member is described in WO 2019/040683 A1, which is hereby incorporated by reference in its entirety.

BRIEF SUMMARY

The present disclosure describes a terminal assembly for a rechargeable battery (e.g., zinc-halide battery) that promotes enhanced battery performance (e.g., battery cycle life, battery capacity, and substantial uniformity in discharge current) through substantially uniform zinc plating on a bipolar electrode plate and enhances battery performance (e.g., cycle life, capacity, or the like).

In one aspect, the present disclosure describes a terminal assembly for an electrochemical battery comprising a terminal connector; a conductive flat-plate with an electrically conducting perimeter; an electrically insulating tape member; and a bipolar electrode plate, wherein the conductive flat-plate, the bipolar electrode plate and the electrically insulating tape member each have inner and outer surfaces at least substantially parallel with each other, wherein the outer surface of the conductive flat-plate is joined to the terminal connector, the inner surface of the conductive flat-plate is joined to the outer surface of the bipolar electrode plate, with the electrically insulating tape member being disposed between the inner surface of the conductive flat-plate and the outer surface of the bipolar electrode plate such that the electrically insulating tape member does not cover the entire inner surface area of the conductive flat-plate, and wherein the electrically conducting perimeter enables bi-directional uniform current flow through the conductive flat-plate between the terminal connector and the bipolar electrode plate.

In some embodiments, the electrically conducting perimeter is substantially rectangular.

In some embodiments, the electrically conducting perimeter is centered within the electrochemically active region of the bipolar electrode plate.

In some embodiments, the conductive flat-plate with electrically insulating tape member is centered within the electrochemically active region of the bipolar electrode plate.

In some embodiments, the insulating tape member has a width, a height, or a combination thereof, that is smaller than a width, a height, or a combination thereof, respectively, of the conductive flat-plate.

Some embodiments further comprise a cathode assembly disposed on the surface of the bipolar electrode plate, wherein the cathode assembly comprises carbon material, and an adhesive layer for bonding carbon material to the bipolar electrode plate. In these embodiments, the terminal assembly is a terminal cathode assembly.

In some embodiments, at least a portion of the surface of the bipolar electrode plate is a rough surface. In those embodiments, wherein the terminal assembly lacks a cathode assembly, the terminal assembly is a terminal anode assembly.

In some embodiments, the carbon material is substantially rectangular. In some embodiments, the ratio of the width of the carbon material to the height of the carbon material is in a range of from about 10:1 to about 2:1.

In some embodiments, the surface of the electrically insulating tape member is joined to the surface of the conductive flat-plate by a weld or an adhesive. In some embodiments, the adhesive is electrically conductive.

In some embodiments, the conductive flat-plate with the electrically insulating tape member is composed of at least one of a copper alloy, a copper/titanium clad, aluminum or electrically conductive ceramics. In other embodiments, the conductive flat-plate with the electrically insulating tape member comprises a titanium material (e.g., TiC coated titanium).

In some embodiments, the conductive flat-plate with the electrically insulating tape member comprises at least one of titanium and copper.

In some embodiments, the terminal connector is a tab assembly and is in electrical communication with the conductive flat-plate.

Another aspect of the present disclosure describes an improved battery frame member for zinc-halide rechargeable batteries. The battery frame member described herein for a zinc-halide rechargeable battery comprises: a liquid diversion system; a gutter; a sealing member; a gas channel; and a ventilation hole.

In some embodiments, the liquid diversion system is in the top portion of the battery frame member to prevent electrolyte from reaching the gas channel during transport. In some embodiments, the battery frame member comprises a gutter shelf and a void space underneath the gutter shelf in the bottom portion of the battery frame member to prevent voltage anomalies during cycling. In some embodiments, the gas channel is enclosed. In some embodiments, the gas channel is covered by a lid. In some embodiments, the lid is attached to the battery frame member by means of welding, gluing, screwing, or snapping the lid to the battery frame member.

In some embodiments, the gas channel is integrated in the battery frame member. In some embodiments, the gas channel is sealed from the external environment with a plug.

In some embodiments, the gutter comprises a gutter shelf and a void space underneath the gutter shelf. In some embodiments, the cathode carbon material rests on the gutter shelf.

In some embodiments, there is no void space underneath the gutter shelf and the gutter shelf extends to the bottom of the battery frame member.

In some embodiments, the sealing member is disposed along a first inner periphery edge. In some embodiments, the sealing member is an O-ring. In some embodiments, the sealing member is a gasket. In some embodiments, the sealing member does not extend around a top portion of the inner periphery edge of the battery frame member. In some embodiments, the sealing member extends around the inner periphery edge of the entire battery frame member. In some embodiments the sealing member is overmolded onto the frame member. In some embodiments, the sealing member is applied to the frame member using a form-in-place liquid curing process. In some embodiments, the sealing member extends above the depth of the frame member and is compressed during assembly.

In some embodiments, the liquid diversion system is in the top portion of the battery frame member directly below a ventilation/fill hole and gas channel.

In some embodiments, the liquid diversion system comprises a primary diverter with two partial blocking walls and multiple secondary blocking walls ensuring liquid is always directed back to an open interior region within the battery frame member. In some embodiments, the secondary blocking walls alternate top down and bottom up relative to the battery frame member.

Yet another aspect of the present disclosure describes a static rechargeable electrochemical battery comprising a pair of terminal assemblies, at least one bipolar electrode interposed between the pair of terminal assemblies, and a battery frame member, as disclosed herein.

BRIEF DESCRIPTION OF DRAWINGS

These and other features, aspects, and advantages of the present disclosure will become better understood when the following detailed description is read with reference to the accompanying drawings.

DETAILED DESCRIPTION

Figure 1:
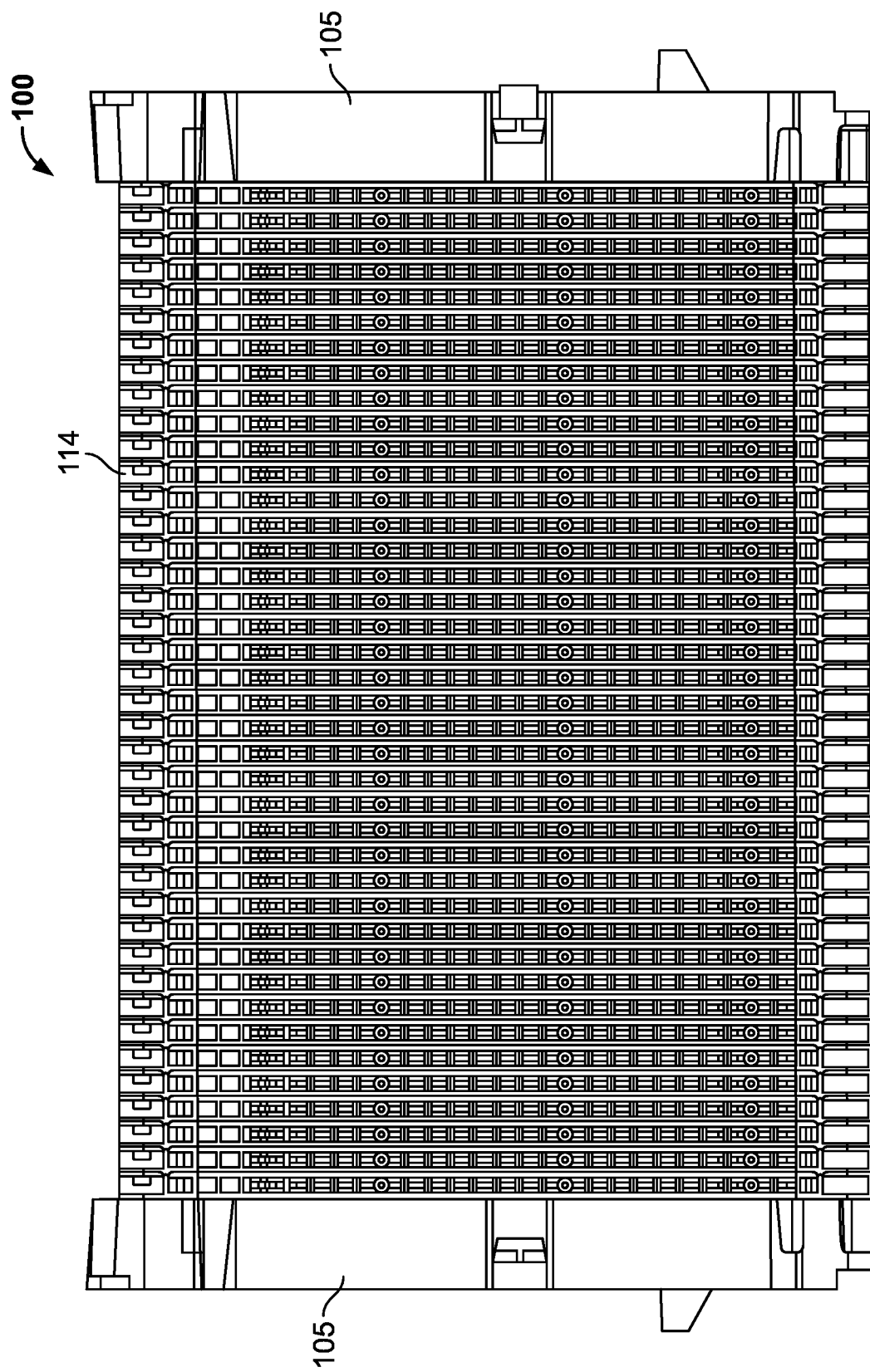
FIG. 1 is a side view of a battery according to an embodiment in the present disclosure.

Embodiments of the present disclosure are described in detail with reference to the drawing figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

I. DEFINITIONS

As used herein, the term "electrochemical cell" or "cell" are used interchangeably to refer to a device capable of either generating electrical energy from chemical reactions or facilitating chemical reactions through the introduction of electrical energy. An electrochemical cell may be a bipolar electrochemical cell or a terminal electrochemical cell.

As used herein, the term "battery" encompasses electrical storage devices comprising at least one electrochemical cell. For example, a battery may be comprised of about 10 to 50 electrochemical cells in series. A "secondary battery" is rechargeable, whereas a "primary battery" is not rechargeable. For secondary batteries of the present disclosure, a battery anode is designated as the positive electrode during discharge, and as the negative electrode during charge.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of metal halide salts (e.g., $ZnBr_2$, $ZnCl_2$, or the like).

As used herein, the term "electrode" refers to an electrical conductor used to make contact with a nonmetallic part of a circuit (e.g., a semiconductor, an electrolyte, or a vacuum). An electrode may also refer to either an anode or a cathode.

As used herein, the term "anode" refers to the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals (e.g., titanium or TiC coated titanium), metal oxides, metal alloys, metal composites, semiconductors, or the like.

As used herein, the term "cathode" refers to the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like.

As used herein, the term "bipolar electrode" refers to an electrode that functions as the anode of one cell and the cathode of another cell. For example, in a battery, a bipolar electrode functions as an anode in one cell and functions as a cathode in an immediately adjacent cell. In some examples, a bipolar electrode comprises two surfaces, a cathode surface and an anode surface, wherein the two surfaces are connected by a conductive material. For instance, a bipolar electrode plate may have opposing surfaces wherein one surface is the anode surface, the other surface is the cathode surface, and the conductive material is the thickness of the plate between the opposing surfaces.

As used herein, the term "halide" refers to a binary compound of a halogen with another element or radical that is less electronegative (or more electropositive) than the halogen, to make a fluoride, chloride, bromide, iodide, or astatide compound.

As used herein, the term "halogen" refers to any of the elements fluorine, chlorine, bromine, iodine, and astatine, occupying group VIIA (17) of the periodic table. Halogens are reactive nonmetallic elements that form strongly acidic compounds with hydrogen, from which simple salts can be made.

As used herein, the term "anion" refers to any chemical entity having one or more permanent negative charges. Examples of anions include, but are not limited to fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, hypobromite, carbonate, chromate, hydrogen carbonate (bicarbonate), dichromate, acetate, formate, cyanide, amide, cyanate, peroxide, thiocyanate, oxalate, hydroxide, and permanganate.

As used herein, a "titanium material" may include, but is not limited to, titanium (in any oxidation state), TiC, alloys of TiC such as TiCxM (where x is 0, 1, 2, 3, or 4 and M is a metal), titanium carbohydrides, non-stoichiometric titanium-carbon compounds, and combinations thereof.

As used herein, "titanium carbide" is used interchangeably with "titanium carbide material" and includes, but is not limited to TiC, alloys of TiC such as TiCxM (where x is 0, 1, 2, 3, or 4 and M is a metal), titanium carbohydrides, non-stoichiometric titanium-carbon compounds, and combinations thereof.

As used herein, the term "zinc metal" refers to elemental zinc, also commonly known as Zn(0) or Zn°.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" comprises any and all combinations of one or more of the associated listed items.

The terms, upper, lower, above, beneath, right, left, etc. may be used herein to describe the position of various elements with relation to other elements. These terms represent the position of elements in an example configuration. However, it will be apparent to one skilled in the art that the battery frame member may be rotated in space without departing from the present disclosure and thus, these terms should not be used to limit the scope of the present disclosure.

As used herein, "over-molding" refers to a process of adding an additional layer of material by injection molding over an already existing piece or part.

As used herein, "plurality" refers to two or more of the elements being described. In some embodiments, plurality refers to three or more, four or more, or five or more of the elements being described.

As used herein, "chemically compatible" refers to a material that does not interfere with the chemistry of an electrochemical cell in a way that meaningfully negatively impacts the performance of the electrochemical cell. The chemically compatible material is chemically compatible with electrolyte (e.g., zinc-halide electrolyte, alkaline electrolyte) and anode and cathode materials.

As used herein, "chemically inert" refers to a material that does not chemically react in any meaningful way with the electrolyte, anode, or cathode of an electrochemical cell.

As used herein, "substantially rectangular" refers to shapes that, while not precisely rectangular, have four sides and, when viewed, have a rectangular appearance.

As used herein, "substantially parallel" means the surfaces of the objects that are substantially parallel are not more than 2° (two degrees) from being parallel across the length of the surfaces.

II. ELECTROCHEMICAL CELL AND BATTERY

Referring to FIGS. 1-14, one aspect the present disclosure provides a static (non-flowing) bipolar zinc-halide rechargeable electrochemical battery (100, 500).

A. Bipolar Electrochemical Battery

Figure 2:
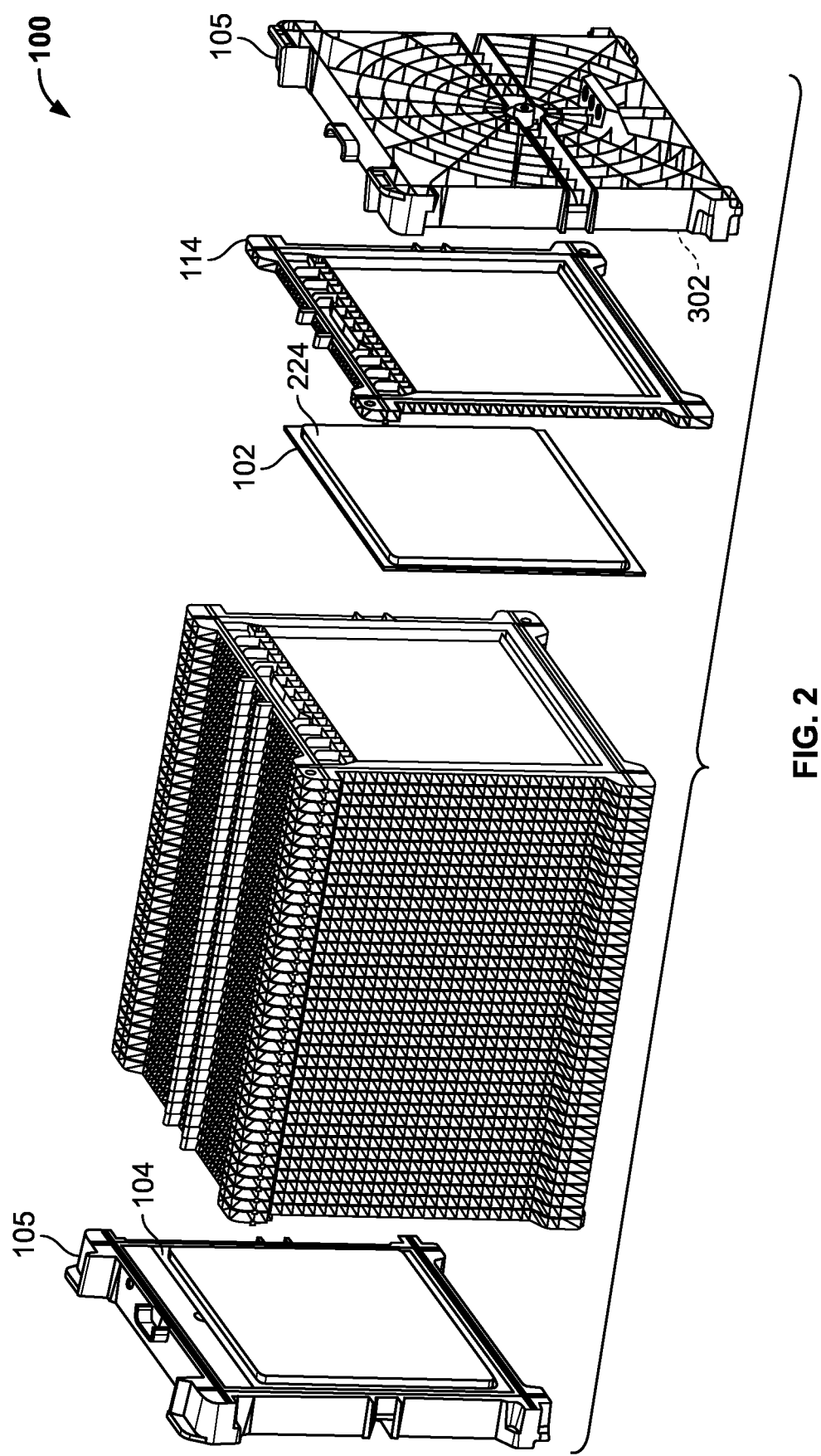
FIG. 2 is an exploded view of the battery of FIG. 1.

Referring to FIGS. 1 and 2, the bipolar electrochemical battery of the present disclosure 100 comprises at least one bipolar electrochemical cell and two terminal electrochemical cells. In some embodiments, the bipolar electrochemical battery comprises about 10 to 50 bipolar electrochemical cells in series and two terminal electrochemical cells. For example, in one embodiment, the bipolar electrochemical battery comprises 38 bipolar electrochemical cells in series and two terminal electrochemical cells.

The at least one bipolar electrochemical cell comprises a bipolar electrode 102, a battery frame member 114, and a zinc-halide electrolyte. The terminal electrochemical cell comprises a bipolar electrode 102, a battery frame member 114, a terminal assembly 104, a terminal endplate 105, and a zinc-halide electrolyte.

1. Bipolar Electrodes

Figure 3:
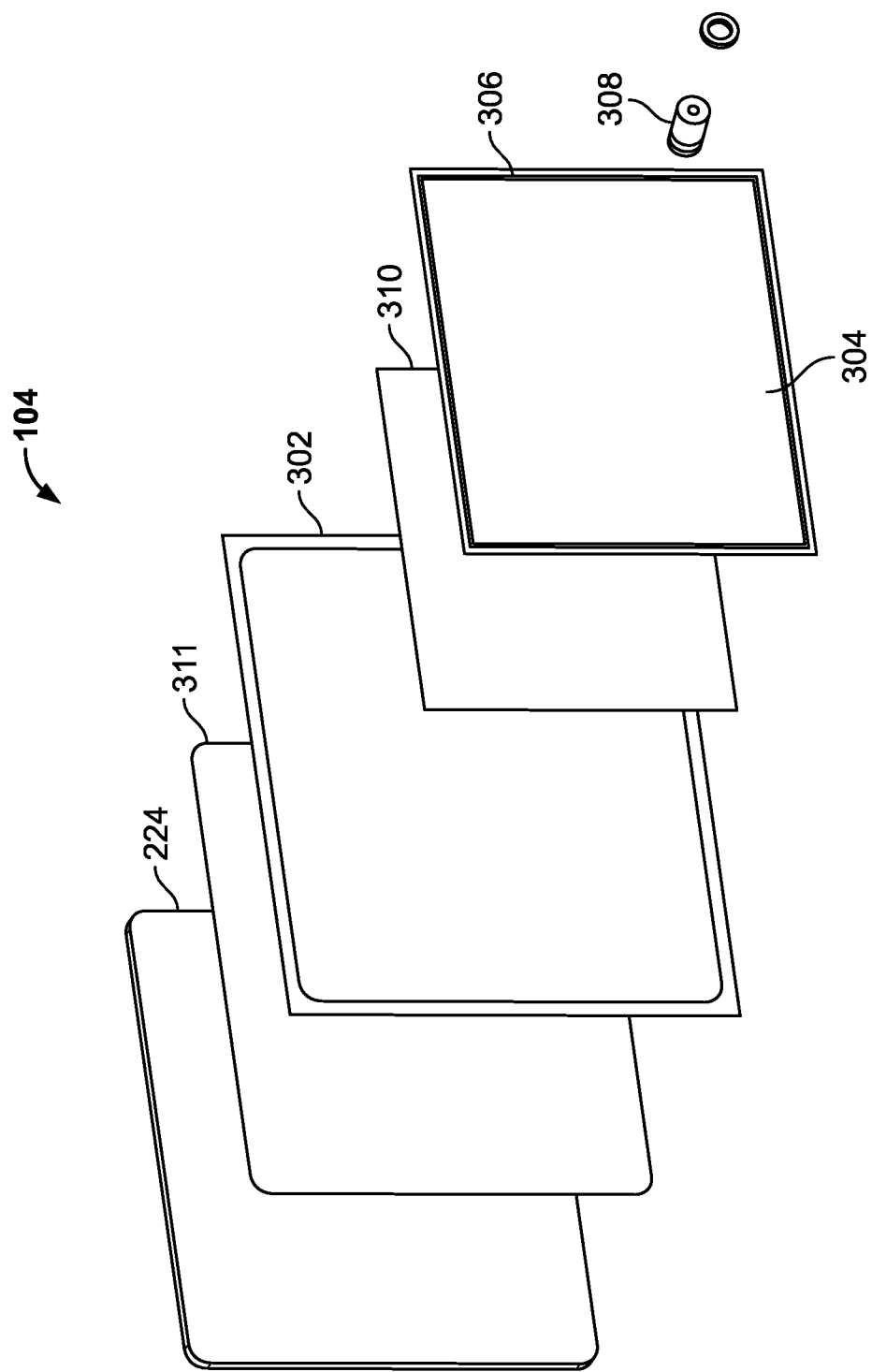
FIG. 3 is an exploded view of a terminal assembly for use in the battery of FIG. 1.

Referring to FIGS. 2 and 3, bipolar electrodes 102 of present disclosure comprise a bipolar electrode plate 302, wherein a carbon material 224 is affixed to the surface of the bipolar electrode plate 302 using an adhesive layer 311 so that the carbon material 224 electrically communicates with at least the surface of the bipolar electrode plate 302. The structure of the bipolar electrodes 102 is described by referring to the exploded view of the terminal assembly 104 in FIG. 3 as the structure of the bipolar electrodes 102 is identical to the structure of the bipolar electrode of the terminal assembly 104.

Bipolar electrodes 102 of the present disclosure are configured to plate zinc metal on an anodic electrode and generate halide or mixed halide species during charging of the electrochemical cell that are reversibly sequestered in the carbon material. Conversely, these electrodes are configured to oxidize plated zinc metal to generate $Zn^{2+}$ cations and reduce the halide or mixed halide species to their corresponding anions during discharging of the electrochemical cell.

a. Bipolar Electrode Plates

The bipolar electrode plate 302 comprises a conductive coating or a film that is relatively inert to the zinc halide electrolyte used in the electrochemical battery. In some embodiments, the coating or the film covers a portion of the surface of the bipolar electrode plate 302. In some embodiments, the bipolar electrode plate 302 comprises titanium, titanium oxide, TiC, TiN, or graphite. Optionally, the bipolar electrode plate 302 is a plastic material that is rendered conductive by incorporating a conductive filler into the plastic. In some embodiments, the bipolar electrode plate 302 comprises a titanium material (e.g., titanium or titanium oxide). In other embodiments, the bipolar electrode plate 302 comprises a titanium material that is coated with a titanium carbide material. In these embodiments, at least a portion of the surface of the bipolar electrode plate 302 is coated with the titanium carbide material. In some embodiments, the bipolar electrode plate 302 comprises an electrically conductive carbon material (e.g., a graphite plate). In some instances, the bipolar electrode plate 302 comprises a graphite plate that is coated with a titanium carbide material. In these embodiments, at least a portion of the surface of the bipolar electrode plate 302 is coated with the titanium carbide material. In some embodiments, the bipolar electrode plate 302 comprises an electrically conductive plastic. Any suitable electrically conductive plastic may be used within the scope of the invention. Conductive plastics are well known to one skilled in the art and not described in detail herein. Such electrically conductive plastic material may comprise a base resin polymer with carbon black, graphite, fumed silica, or combinations thereof. For example, electrically conductive plastics described in U.S. Pat. No. 4,169,816, filed Mar. 6, 1978, which is incorporated herein by reference, may be used within the scope of the disclosure.

The bipolar electrode plates may be formed by stamping or other suitable processes. A portion of the surface of the bipolar electrode plate 302 may optionally undergo surface treatments (e.g., coating or the like) to enhance the electrochemical properties of the cell or battery. The inner surface of the bipolar electrode plate may include an electrochemically active region associated with or defined by the formation of a layer of zinc metal upon cell or battery charging. In some embodiments, the inner surface of the electrode plate may be sandblasted or otherwise treated within the electrochemically active region. In other embodiments, the outer surface may also be sandblasted within an electrochemically active region associated with a region enclosed by the cathode assembly.

For example, in some embodiments, at least a portion of the inner surface, at least a portion of the outer surface, or at least portions of both surfaces are treated (e.g., sandblasted) to give a rough surface. In some instances, at least a portion of the inner surface of the bipolar electrode plate is treated (e.g., sandblasted) to give a rough surface. In some instances, the region of the inner surface that is treated to give a rough surface is substantially defined by the periphery of the cathode assembly affixed to the outer surface of the electrode plate.

b. Cathode Assemblies

Electrochemical cell of the present disclosure comprises a cathode assembly, wherein the cathode assembly comprises at least one carbon material 224 and an adhesive layer 311 electrically connecting the carbon material 224 to a bipolar electrode plate 302. The carbon material is situated on the coating material that is on the surface (e.g., the cathodic surface) of the bipolar electrode plate 302.

i. Carbon Material

The carbon material 224 is in electrical communication with the surface of the bipolar electrode plate 302 and is adhered to the bipolar electrode plate 302 using an adhesive layer 311. Carbon materials suitable for electrochemical cells of the present disclosure may comprise any carbon material that can reversibly absorb aqueous bromine species (e.g., aqueous bromine or aqueous bromide) and is substantially chemically inert in the presence of the electrolyte. In some embodiments, the carbon material comprises carbon blacks or other furnace process carbons. Suitable carbon black materials include, but are not limited to, Cabot Vulcan® XC72R, Akzo-Nobel Ketjenblack EC600JD, and other matte black mixtures of conductive furnace process carbon blacks. In some embodiments, the carbon material may also include other components, including but not limited to a PTFE binder and de-ionized water. For example, the carbon material has a water content of less than 50 wt % (e.g., from about 0.01 wt % to about 30 wt %) by weight of the carbon material. In some embodiments, the carbon material comprises PTFE (e.g., from about 0.5 wt % to about 5 wt % by weight of the carbon material).

In some embodiments, the carbon material may be in the form of one or more thin rectangular blocks. In some embodiments, the carbon material may comprise a single solid block. In other embodiments, the carbon material may comprise from one to five, one to three, or one to two solid blocks of carbon blacks.

In some embodiments, the carbon material may be comprised of a woven carbon fiber or a non-woven carbon felt material.

2. Terminal Assembly

Another aspect of the present disclosure provides a terminal assembly for an electrochemical battery. Referring to FIG. 3, a terminal assembly 104 of the present disclosure comprises a terminal connector 308; a conductive flat-plate 304 with an electrically conducting perimeter 306; an electrically insulating tape member 310; and a bipolar electrode plate 302. The conductive flat-plate 304, the bipolar electrode plate 302 and the electrically insulating tape member 310 each have inner and outer surfaces at least substantially parallel with each other, wherein the outer surface of the conductive flat-plate 304 is joined to the terminal connector 308, the inner surface of the conductive flat-plate 304 is joined to the outer surface of the bipolar electrode plate 302, with the electrically insulating tape member 310 being disposed between the inner surface of the conductive flat-plate 304 and the outer surface of the bipolar electrode plate 302 such that the electrically insulating tape member 310 does not cover the entire inner surface area of the conductive flat-plate 304, and wherein the electrically conducting perimeter 306 enables bi-directional uniform current flow through the conductive flat-plate 304 between the terminal connector 308 and the bipolar electrode plate 302.

Since the insulating tape member 310 does not cover entire surface of the conductive flat-plate 304, it permits the electrically conducting perimeter 306 to be in electrical communication with the bipolar electrode plate 302. In some embodiments, the dimensions of the insulating tape member 310 is smaller than the dimensions of the conductive flat-plate 304. In some embodiments, the insulating tape member 310 has a width, a height, or a combination thereof, that is smaller than a width, a height, or a combination thereof, respectively, of the conductive flat-plate 304. The terminal connector 308 of the bipolar electrochemical battery is connected for electrical communication with the conductive flat-plate 304. In some embodiments, the outer surface of the conductive flat-plate 304 is joined to the terminal connector 308. In some embodiments, the terminal connector 308 comprises any electrically conducting material. In one embodiment, the terminal comprises brass (e.g., the terminal is a brass plug that electrically communicates or contacts the terminal perimeter).

The bipolar electrode plate 302 of the terminal assembly 104 has inner and outer surfaces at least substantially parallel with the inner and outer surfaces of the conductive flat-plate 304 and electrically insulating tape member 310. The bipolar electrode plate 302 may comprise, without limitation, a titanium material that is coated with a titanium carbide material, thru holes, rough inner surface, or the like. The electrically conducting perimeter 306 of the flat-plate 304 with electrically insulating tape member 310 joins to the bipolar electrode plate 302 such that the electrically conducting perimeter 306 is approximately centered about the electrochemically active region of the bipolar electrode plate 302. In some embodiments, the electrochemically active region corresponds to a region extending between the inner and outer surfaces of the bipolar electrode plate 302 in chemical or electrical communication with the adjacent bipolar electrode plate during charge and discharge cycles of the electrochemical battery. In these embodiments, the electrochemically active region for the bipolar electrode plate 302 associated with the cathode terminal of the battery corresponds to or is defined by an area enclosed by a cathode assembly disposed upon the inner surface of the bipolar electrode plate 302 (e.g., the terminal cathode electrode plate). The electrochemically active region for the bipolar electrode plate 302 associated with the anode terminal of the battery may correspond to an area on its inner surface that opposes a cathode assembly disposed on the front surface of an adjacent bipolar electrode plate and forms a layer of zinc metal upon charging of the battery (terminal anode assembly). In some embodiments, at least a portion of the surface (e.g., at least the chemically active region) of the bipolar electrode plate 302 of the terminal anode assembly is a rough surface.

FIG. 3 provides an exploded view of a terminal assembly for use in the battery of FIG. 1 showing the cathode carbon material 224, the adhesive layer 311, the bipolar electrode plate 302, the electrically insulating tape member 310, the conductive flat-plate 304, the electrically conducting perimeter 306, and the terminal connector 308.

In some embodiments, the electrically conducting perimeter 306 formed by welding is centered within the electrochemically active region of the bipolar electrode plate 302. In some embodiments, the electrically conducting perimeter 306 is substantially rectangular, substantially circular or substantially elliptical. In some embodiments, the electrically conducting perimeter 306 is substantially rectangular.

In some embodiments, the conductive flat-plate 304 with electrically insulating tape member 310 is centered within the electrochemically active region of the bipolar electrode plate 302.

In some embodiments, the surface of the electrically insulating tape member is joined to the surface of the conductive flat-plate by a weld or an adhesive. In some embodiments, the adhesive is electrically conductive.

The conductive flat-plate disclosed herein is larger than prior art current aggregators, and hence, it provides more contact points and better current density distribution. This reduces manufacturing costs.

In some embodiments, the terminal assembly is a terminal cathode assembly, wherein the terminal cathode assembly comprises a bipolar electrode plate 302 having an electrochemically active region, a conductive flat-plate 304 with electrically insulating tape member 310 disposed on the surface of the bipolar electrode plate 302 and approximately centered in the electrochemically active region, and a cathode assembly such as any of the cathode assemblies described herein disposed on the inner surface of the bipolar electrode plate 302.

In some embodiments, the terminal assembly is a terminal anode assembly, wherein the terminal anode assembly comprises a bipolar electrode plate 302 having an electrochemically active region, a conductive flat-plate 304 with electrically insulating tape member 310 centered in the electrochemically active region, and wherein the terminal anode assembly lacks a cathode assembly.

In some embodiments, the electrically conducting perimeter 306 of the conductive flat-plate 304 with electrically insulating tape member 310 is joined to the surface of the bipolar electrode plate 302 by a weld or an adhesive. In some instances, the adhesive is electrically conductive. Non-limiting examples of suitable electrically conductive adhesives include graphite filled adhesives (e.g., graphite filled epoxy, graphite filled silicone, graphite filled elastomer, or any combination thereof), nickel filled adhesives (e.g., nickel filled epoxy), silver filled adhesives (e.g., silver filled epoxy), copper filled adhesives (e.g., copper filled epoxy), any combination thereof, or the like.

In some embodiments, the conductive flat-plate 304 with electrically insulating tape member 310 is composed of at least one of a copper alloy, a copper/titanium clad, aluminum, titanium, and electrically conductive ceramics.

In some embodiments, at least one of the conductive flat-plate 304 with electrically insulating tape member 310 or the bipolar electrode plate 302 comprises titanium. In some embodiments, at least one of the conductive flat-plate 304 with electrically insulating tape member 310 or the bipolar electrode plate 302 comprises a titanium material coated with a titanium carbide material.

In some embodiments, the inner surfaces of at least one of the conductive flat-plate 304 with electrically insulating tape member 310 comprises copper.

In some embodiments, the outer surface of at least one of the conductive flat-plate 304 with electrically insulating tape member 310 comprises at least one of copper, titanium, and electrically conductive ceramics.

In some embodiments, the conductive flat-plate 304 with electrically insulating tape member 310 comprises a first metal and the bipolar electrode plate 302 comprises a second metal.

In some embodiments, the electrically insulating tape member 310 may be comprised of any adhesive material that is electrically insulating in nature. Non-limiting examples of the electrically insulating tape member 310 include, for example, Kapton™, Mylar™, polyimide, polyethylene, nylon, Teflon, neoprene, or any other electrically insulating polymer.

3. Battery Frame Members

In some embodiments, the battery disclosed herein comprises a battery frame member 114 that is interposed between two adjacent bipolar electrodes or interposed between a bipolar electrode 102 and a terminal assembly 104 (e.g., a terminal anode assembly or a terminal cathode assembly).

Figure 4:
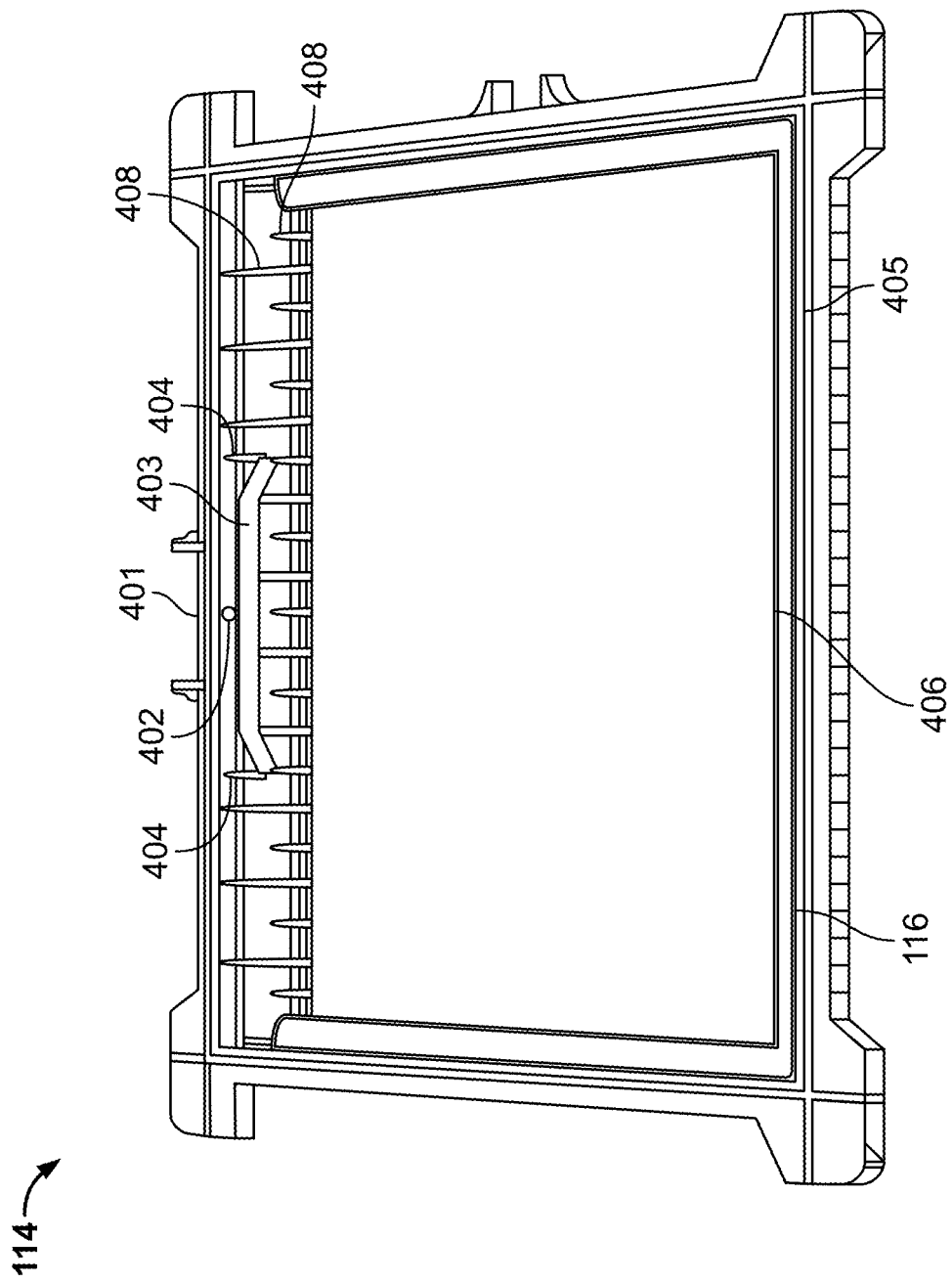
FIG. 4 is a front view of a battery frame member for use in the battery of FIG. 1.

In one embodiment, illustrated in FIG. 4, the battery frame member 114 has an outer periphery edge, and an inner periphery edge defining an open interior region. In some embodiments, the battery frame member 114 is configured such that open interior region is approximately centered about the center of an electrochemically active region of a bipolar electrode plate 302 received by the battery frame member 114 and/or the center of a cathode assembly disposed on a bipolar electrode plate 302. In some embodiments, the outer periphery of the battery frame member 114 defines the outer surface of a battery.

In some embodiments, the battery frame member 114 includes a first side that opposes and retains the first bipolar electrode plate 302 and a second side disposed on an opposite side of the battery frame member 114 than the first side that opposes and retains a second bipolar electrode plate. The second electrode plate is adjacent and parallel to the first electrode plate in the battery. The first and second electrode plates and the terminal electrode plate(s) may be configured to have substantially the same size and shape. In some embodiments, the battery frame member 114 is in contact with an anode bipolar electrode plate on one side and a cathode bipolar electrode plate of the adjacent bipolar cell on the other side.

In some embodiments, the battery frame member 114 includes a sealing member 116 (FIG. 4) that extends around the inner periphery edge. In some embodiments, the sealing member is only disposed on three of the inner periphery edges, with the top excluded. In some embodiments, the battery frame member 114 comprises a first sealing member 116 disposed along the first inner periphery edge. In some embodiments, the first sealing member is an O-ring. In some embodiments, the first sealing member 116 is a gasket. In some embodiments, each inner periphery edge is configured to receive a sealing member 116 seated therein that forms a substantially leak-free seal when the seal is compressed between the corresponding bipolar electrode plate or terminal electrode plate and the battery frame member 114 when the electrochemical battery is assembled to provide a sealing interface between the bipolar electrode plate or endplate and the battery frame member 114. The sealing members cooperate to retain the electrolyte between the opposing bipolar electrode plates and a battery frame member 114, or between a bipolar electrode plate, a terminal electrode plate and a frame member 114. In some embodiments the sealing member 116 is overmolded onto the frame member 114. In some embodiments, the sealing member 116 is applied to the frame member 114 using a form in place liquid curing process. In some embodiments, the sealing member 116 extends above the depth of the frame member 114 and is compressed during assembly.

In some embodiments, the battery frame member 114 comprises a gutter in the bottom portion of the battery frame member 114 to prevent voltage anomalies during cycling. In some embodiments, the gutter comprises a gutter shelf 406 and a void space 407 underneath the gutter shelf 406. In some embodiments, the cathode carbon material 224 rests on the gutter shelf 406. It has been found that the presence of the gutter shelf and the void underneath the gutter shelf prevent voltage anomalies during cycling. In some embodiments, there is no void space 407 underneath the gutter shelf 406 and the gutter shelf 406 extends to the bottom of the battery frame member 114. In some embodiments, the gutter shelf 406, upon which the cathode carbon material 224 rests may be between 0.5 and 5 cm in height, including void space 407 under gutter shelf 406, and may be between 3 and 10 mm in depth, where depth is perpendicular to the height and width of the battery frame member 114, along the entire bottom portion of the battery frame member 114 width.

In some embodiments, the battery frame member comprises a first frame member and a second frame member. In some embodiments, the first frame member and the second frame member are horizontally stacked and vertically oriented, wherein a first outer edge of the first frame member is substantially coplanar with a second outer edge of the second frame member.

In some embodiments of a battery, each battery frame member 114 is plastic welded to the adjacent frame member 114 using a weld bead 405 around the perimeter of the battery frame member 114.

In some embodiments, the battery frame member 114 comprises an integrated gas channel 401 on the top of the battery frame member 114 directly above a ventilation hole 402. The ventilation hole 402 allows gas to escape into the gas channel 401. In some embodiments, the gas channel 401 sits on top of the battery frame member 114, centered over the ventilation holes 402 of the series of battery frame members 114. The gas channel is enclosed. In some embodiments, a portion of the gas channel 401 is formed in the battery frame member 114 and a cover is placed thereon after the frame member is assembled into a battery to enclose the gas channel 401. Optionally, the gas channel 401 is covered by a lid 409 that is attached to the battery frame member 114 to enclose the gas channel 401. In some embodiments, the lid 409 is attached to the battery frame member 114 by means of welding, gluing, screwing, or snapping the lid 409 to the battery frame member 114. In other embodiments the lid 409 forms both the top and a portion of the sides of the gas channel 401. The gas channel 401 provides a headspace for the gases from the electrochemical cell in the battery frame member 114.

In some embodiments, a liquid diversion system exists in the top of the battery frame member 114 directly below the ventilation hole 402 which allows gas to escape into the gas channel 401. While the gas channel 401 provides gas communication throughout the battery 100, the liquid diversion system prevents liquid from entering the gas channel 401 via a series of features. In some embodiments, the liquid diversion system comprises a primary diverter feature 403 with two partial blocking walls 404 and multiple secondary blocking walls 408 ensuring liquid always is directed back to the open interior region within the battery frame member 114. In some embodiments, the primary diverter 403 consists of a horizontal plastic protrusion with end pieces facing downward with an angle ranging from 30 to 60 degrees. In some embodiments, secondary blocking walls ensure minimum fluid will reach the primary diverter. In some embodiments, the secondary blocking walls 408 are designed so that all protrude top down or bottom up relative to the battery frame member 114, where the top of the battery frame member 114 is denoted by the gas channel 401. In some embodiments, the secondary blocking walls 408 are of various lengths. One of the advantages of the liquid diversion system is that it improves quality of the battery by keeping the electrolyte contained within battery frame member 114 during transportation.

Each battery frame member 114 may be formed from flame retardant polypropylene, high density polyethylene, polyphenylene oxide, polyphenylene ether, polystyrene, or a combination thereof. Each battery frame member 114 may receive two adjacent bipolar electrode plates or a bipolar electrode plate and a terminal electrode plate. Each battery frame member 114 may also house an aqueous electrolyte solution (e.g., zinc-halide electrolyte or zinc-bromide electrolyte) which is received via the ventilation hole 402.

Figure 5:
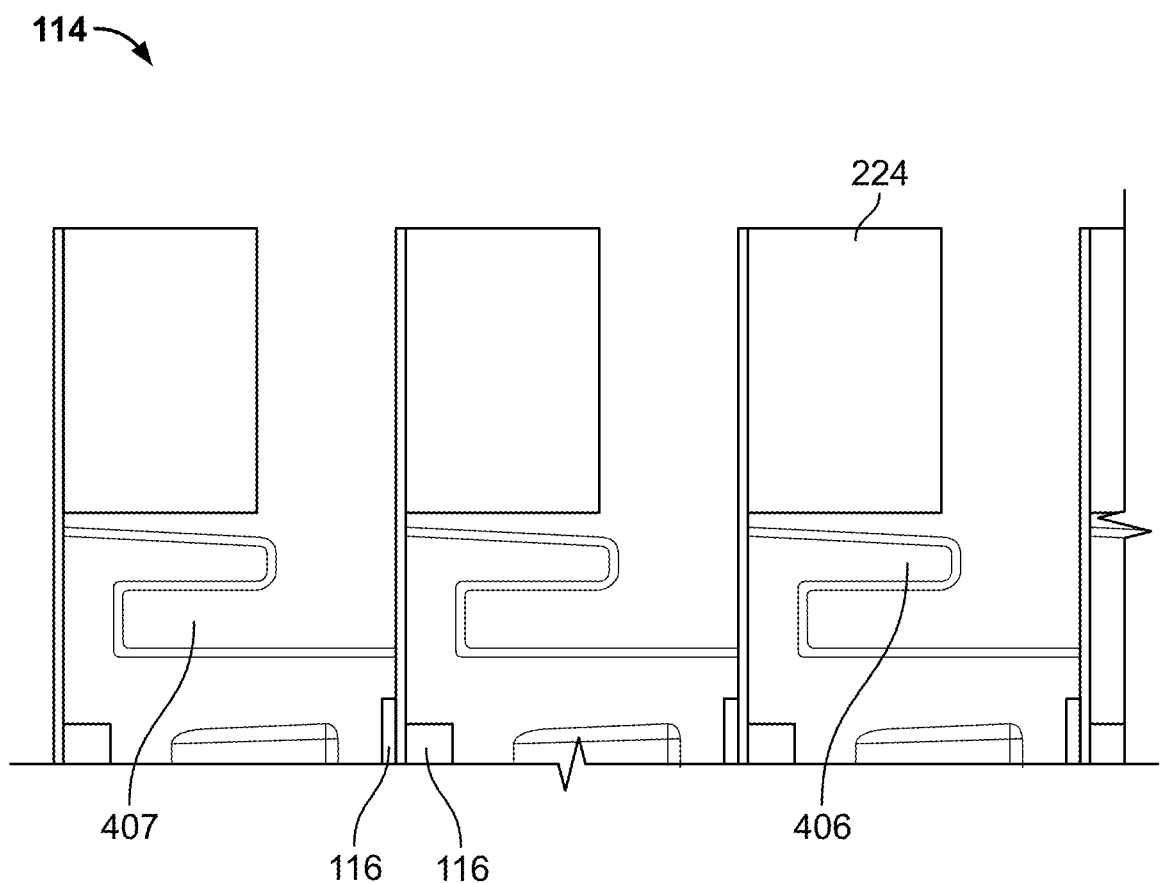
FIG. 5 is a close-up sideview of the bottom of the battery frame member of FIG. 4.

FIG. 5 shows a close-up side-view of the bottom portion of the battery frame member 114 showing the gutter shelf 406 and the void space 407 under the gutter shelf. In this embodiment, each frame member within the battery contains the gutter shelf 406 and void space 407.

4 Zinc-Halide Electrolyte

The zinc-halide electrolyte is described in U.S. Pat. No. 10,305,111, which is hereby incorporated by reference in its entirety.

B. Another Embodiment of Bipolar Electrochemical Battery

Referring to FIGS. 6-10, another embodiment of a static (non-flowing) bipolar zinc-halide rechargeable electrochemical battery 500 of the present disclosure is illustrated. The bipolar electrochemical battery 500 may be substantially similar to the bipolar electrochemical battery 100 except as otherwise shown or described herein. For example, in this embodiment, the bipolar electrochemical battery 500 may be substantially rectangular, with one dimension being visibly greater than the other so as to convey a rectangular appearance. In the X-Y-Z coordinate space illustrated in FIG. 7, the width dimension of the bipolar electrochemical battery 500 is in the X direction and it is the greater dimension relative to Y, which gives the bipolar electrochemical battery 500 a rectangular appearance. The height dimension of the bipolar electrochemical battery 500 is in the Y dimension and it is the shorter dimension relative to the width dimension. The orientation of the bipolar electrochemical battery 500 and the orientation of the carbon material are complementary such that the width and the height of the bipolar electrochemical battery 500 share about the same orientation as the width and the height, respectively, of the carbon material, which are described below and shown in FIGS. 8 and 10. Using the page as a reference, the X and Y dimensions are perpendicular to each other in the plane of the page and the Z dimension is into the page.

Figure 6:
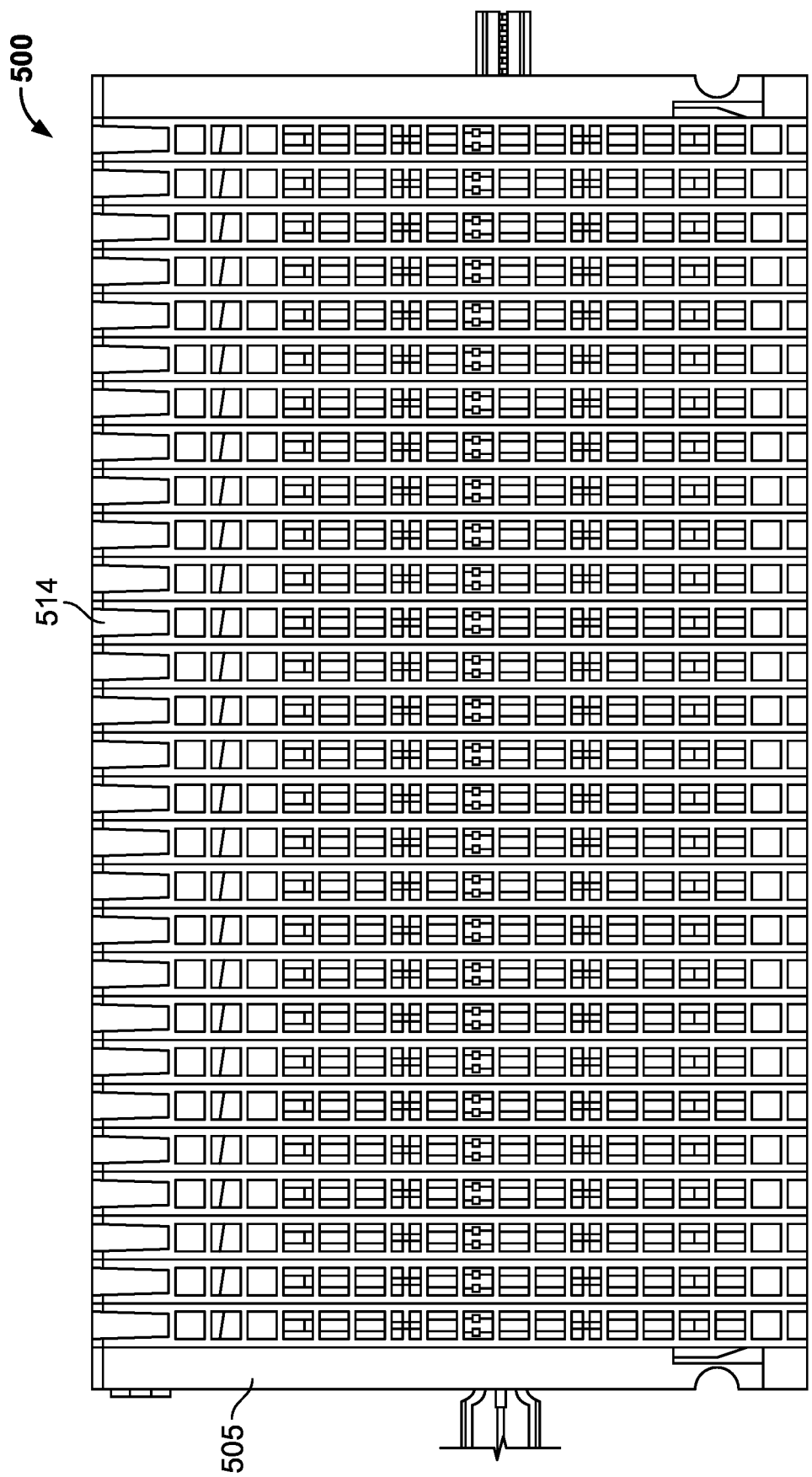
FIG. 6 is a side view of a battery according to another embodiment in the present disclosure.
Figure 7:
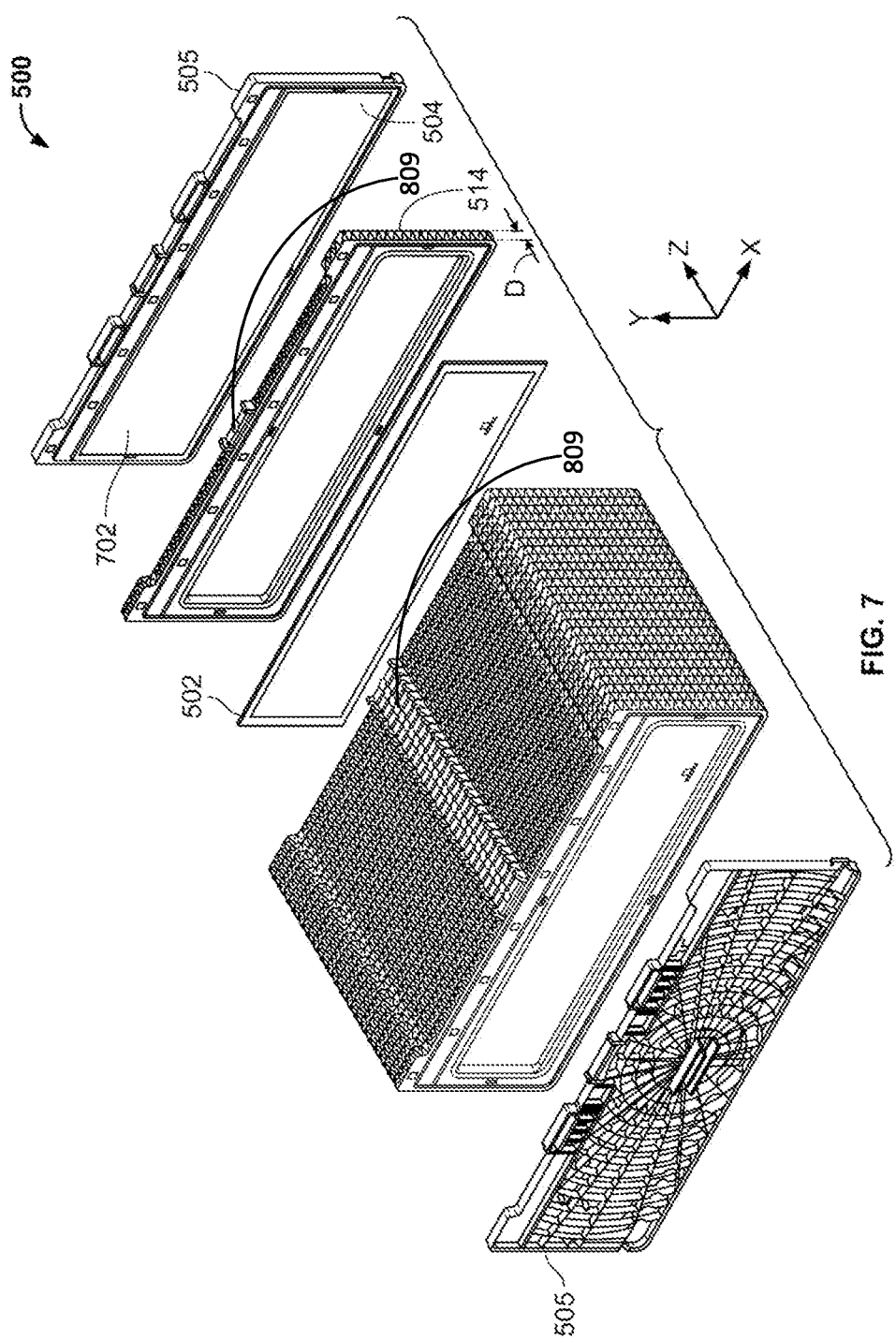
FIG. 7 is an exploded view of the battery of FIG. 6.

Referring to FIGS. 6 and 7, the bipolar electrochemical battery of the present disclosure 500 comprises at least one bipolar electrochemical cell and two terminal electrochemical cells. In some embodiments, the bipolar electrochemical battery comprises about 10 to 50 bipolar electrochemical cells in series and two terminal electrochemical cells. For example, in one embodiment, the bipolar electrochemical battery comprises 26 bipolar electrochemical cells in series and two terminal electrochemical cells.

The at least one bipolar electrochemical cell comprises a bipolar electrode 502, a battery frame member 514, and a zinc-halide electrolyte. The terminal electrochemical cell comprises a bipolar electrode 502, a battery frame member 514, a terminal assembly 504, a terminal endplate 505, and a zinc-halide electrolyte.

1. Bipolar Electrodes

Figure 8:
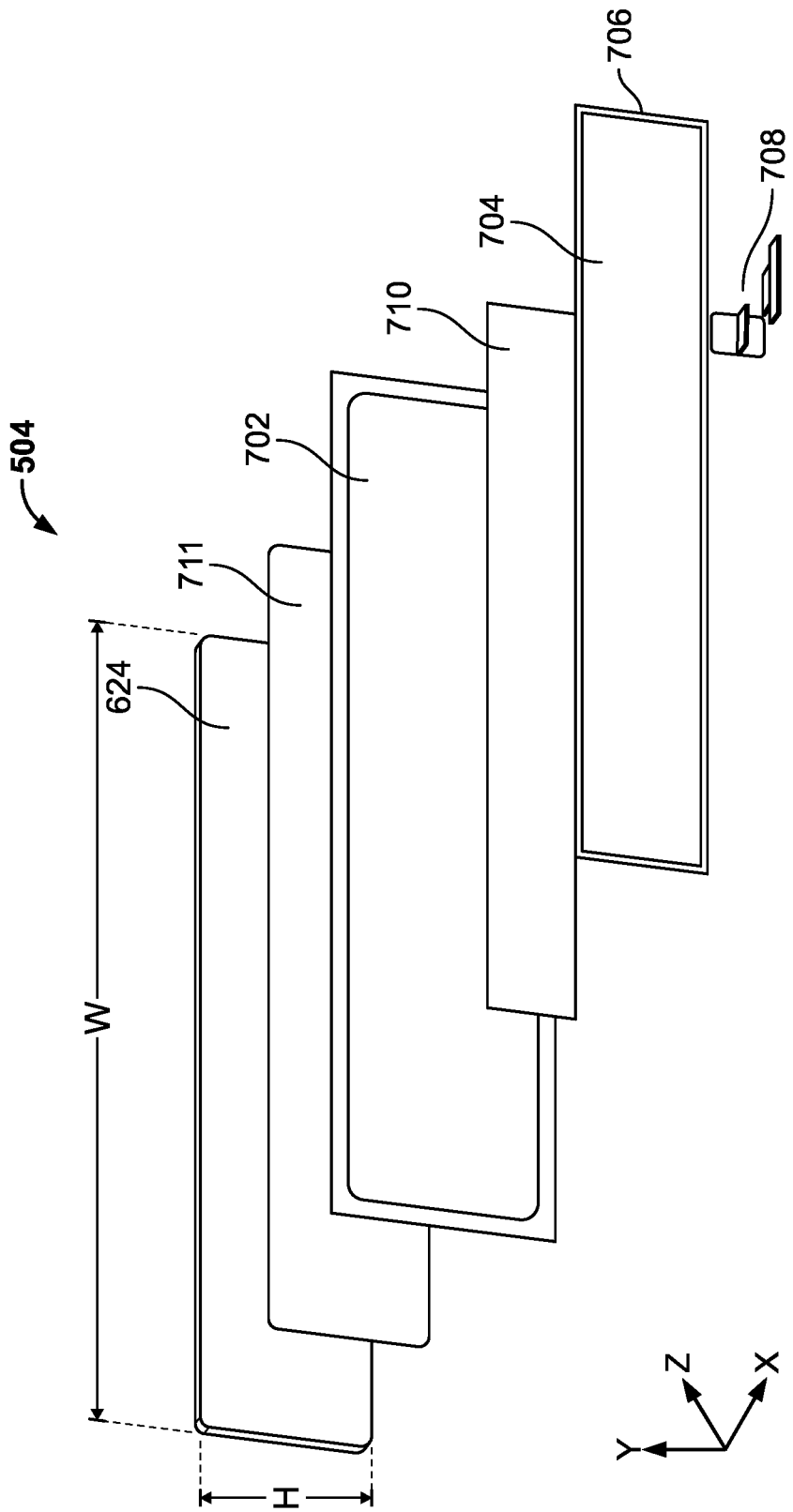
FIG. 8 is an exploded view of a terminal assembly for use in the battery of FIG. 6.

Referring to FIGS. 7 and 8, bipolar electrodes 502 of present disclosure comprise a bipolar electrode plate 702, wherein a carbon material 624 is affixed to the surface of the bipolar electrode plate 702 using an adhesive layer 711 so that the carbon material 624 electrically communicates with at least the surface of the bipolar electrode plate 702. The structure of the bipolar electrodes 502 is described by referring to the exploded view of the terminal assembly 504 in FIG. 8 as the structure of the bipolar electrodes 502 is identical to the structure of the bipolar electrode of the terminal assembly 504.

Bipolar electrodes 502 of the present disclosure are configured to plate zinc metal on an anodic electrode and generate halide or mixed halide species during charging of the electrochemical cell that are reversibly sequestered in the carbon material. Conversely, these electrodes are configured to oxidize plated zinc metal to generate $Zn^{2+}$ cations and reduce the halide or mixed halide species to their corresponding anions during discharging of the electrochemical cell.

a. Bipolar Electrode Plates

The bipolar electrode plate 702 comprises a conductive coating or a film that is relatively inert to the zinc halide electrolyte used in the electrochemical battery. In some embodiments, the coating or the film covers a portion of the surface of the bipolar electrode plate 702. In some embodiments, the bipolar electrode plate 702 comprises titanium, titanium oxide, TiC, TiN, or graphite. Optionally, the bipolar electrode plate 702 is a plastic material that is rendered conductive by incorporating a conductive filler into the plastic. In some embodiments, the bipolar electrode plate 702 comprises a titanium material (e.g., titanium or titanium oxide). In other embodiments, the bipolar electrode plate 702 comprises a titanium material that is coated with a titanium carbide material. In these embodiments, at least a portion of the surface of the bipolar electrode plate 702 is coated with the titanium carbide material. In some embodiments, the bipolar electrode plate 702 comprises an electrically conductive carbon material (e.g., a graphite plate). In some instances, the bipolar electrode plate 702 comprises a graphite plate that is coated with a titanium carbide material. In these embodiments, at least a portion of the surface of the bipolar electrode plate 702 is coated with the titanium carbide material. In some embodiments, the bipolar electrode plate 702 comprises an electrically conductive plastic. Any suitable electrically conductive plastic may be used within the scope of the invention. Conductive plastics are well known to one skilled in the art and not described in detail herein. Such electrically conductive plastic material may comprise a base resin polymer with carbon black, graphite, fumed silica, or combinations thereof. For example, electrically conductive plastics described in U.S. Pat. No. 4,169,816, filed Mar. 6, 1978, which is incorporated herein by reference, may be used within the scope of the disclosure.

Figure 10:
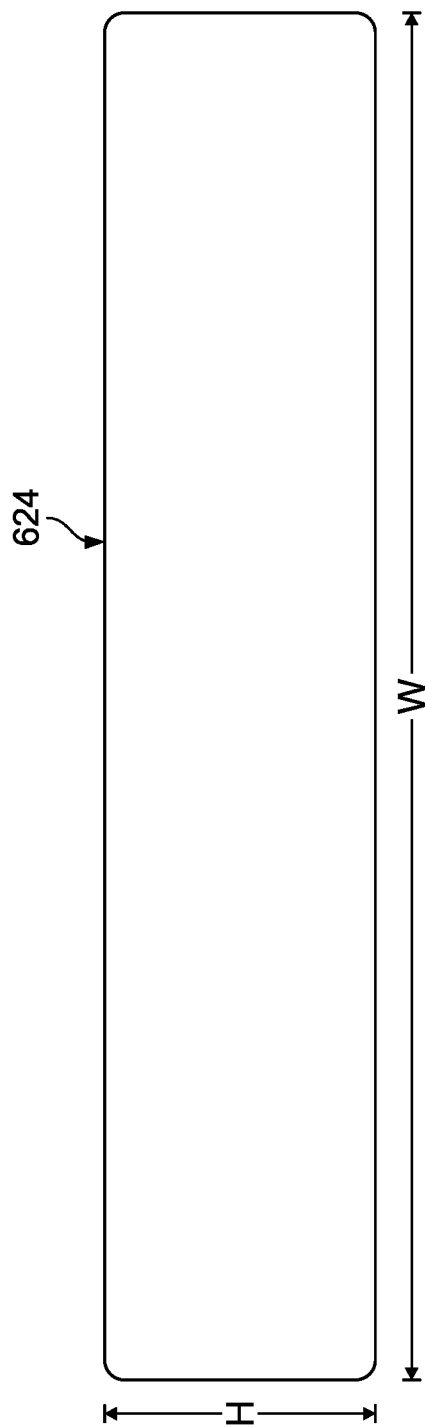
FIG. 10 is a front view of the carbon material for use in the battery of FIG. 6.

In this embodiment, the bipolar electrode plates may be substantially rectangular, with one dimension being visibly greater than the other so as to convey a rectangular appearance. In the X-Y-Z coordinate space illustrated in FIG. 7, the width dimension of the terminal assembly 504 is in the X direction and it is the greater dimension relative to Y. The height dimension of the terminal assembly 504 is in the Y direction and it is a shorter dimension compared with the X dimension, giving the illustrated terminal assembly 504 and the exploded battery a rectangular appearance. The Z direction is representative of the depth (i.e., thickness) of the illustrated battery components. As seen in FIGS. 7, 8 and 10, the orientation of the bipolar electrode plates and the orientation of the carbon material are complementary to the orientation of the terminal assembly 504 such that the width and the height of the bipolar electrode plates and the width and height of the carbon material share about the same orientation as the width and the height, respectively, of the terminal assembly 504 shown in FIG. 7.

The bipolar electrode plates may be formed by stamping or other suitable processes. A portion of the surface of the bipolar electrode plate 702 may optionally undergo surface treatments (e.g., coating or the like) to enhance the electrochemical properties of the cell or battery. The inner surface of the bipolar electrode plate may include an electrochemically active region associated with or defined by the formation of a layer of zinc metal upon cell or battery charging. In some embodiments, the inner surface of the electrode plate may be sandblasted or otherwise treated within the electrochemically active region. In other embodiments, the outer surface may also be sandblasted within an electrochemically active region associated with a region enclosed by the cathode assembly.

For example, in some embodiments, at least a portion of the inner surface, at least a portion of the outer surface, or at least portions of both surfaces are treated (e.g., sandblasted) to give a rough surface. In some instances, at least a portion of the inner surface of the bipolar electrode plate is treated (e.g., sandblasted) to give a rough surface. In some instances, the region of the inner surface that is treated to give a rough surface is substantially defined by the periphery of the cathode assembly affixed to the outer surface of the electrode plate.

b. Cathode Assemblies

The electrochemical cell of the present disclosure comprises a cathode assembly, wherein the cathode assembly comprises at least one carbon material 624 and an adhesive layer 711 electrically connecting the carbon material 624 to a bipolar electrode plate 702. The carbon material is situated on the coating material that is on the surface (e.g., the cathodic surface) of the bipolar electrode plate 702.

i. Carbon Material

The carbon material 624 is in electrical communication with the surface of the bipolar electrode plate 702 and is adhered to the bipolar electrode plate 702 using an adhesive layer 711. Carbon materials suitable for electrochemical cells of the present disclosure may comprise any carbon material that can reversibly absorb aqueous bromine species (e.g., aqueous bromine or aqueous bromide) and is substantially chemically inert in the presence of the electrolyte. In some embodiments, the carbon material comprises carbon blacks or other furnace process carbons. Suitable carbon black materials include, but are not limited to, Cabot Vulcan® XC72R, Akzo-Nobel Ketjenblack EC600JD, and other matte black mixtures of conductive furnace process carbon blacks. In some embodiments, the carbon material may also include other components, including but not limited to a PTFE binder and de-ionized water. For example, the carbon material has a water content of less than 50 wt % (e.g., from about 0.01 wt % to about 30 wt %) by weight of the carbon material. In some embodiments, the carbon material comprises PTFE (e.g., from about 0.5 wt % to about 5 wt % by weight of the carbon material).

In some embodiments, the carbon material may be in the form of one or more thin rectangular blocks. In some embodiments, the carbon material may comprise a single solid block. In other embodiments, the carbon material may comprise from one to five, one to three, or one to two solid blocks of carbon blacks.

In some embodiments, the carbon material may be comprised of a woven carbon fiber or a non-woven carbon felt material.

In some embodiments, the carbon material may be substantially rectangular with one dimension being visibly greater than the other so as to convey a rectangular appearance. In the X-Y-Z coordinate space illustrated in FIGS. 7 and 8, the width dimension of the carbon material 624 is in the X direction (illustrated in FIGS. 8 and 10 as "W") and it is the greater dimension relative to Y, which gives the article a rectangular appearance. The height dimension of the carbon material 624 is in the Y direction (illustrated in FIGS. 8 and 10 as "H") and it is the shorter dimension relative to the width dimension. The orientation of the bipolar electrochemical battery 500 and the orientation of the carbon material 624 are complementary such that the width and the height of bipolar electrochemical battery 500 are share about the same orientation as the width and the height, respectively, of the carbon material 624.

In some embodiments, the carbon material 624 has an aspect ratio (referred to in this application as the ratio of width to height) in the range of from about 10:1 to about 2:1. In other embodiments, the carbon material 624 has an aspect ratio in the range is from about 7:1 to about 3:1. In yet other embodiments, the carbon material 624 has an aspect ratio in the range is from about 5:1 to about 2:1. As shown in the EXAMPLES below, the inventors of the present application have found that battery performance is unexpectedly increased with increasing aspect ratios.

Figure 9:
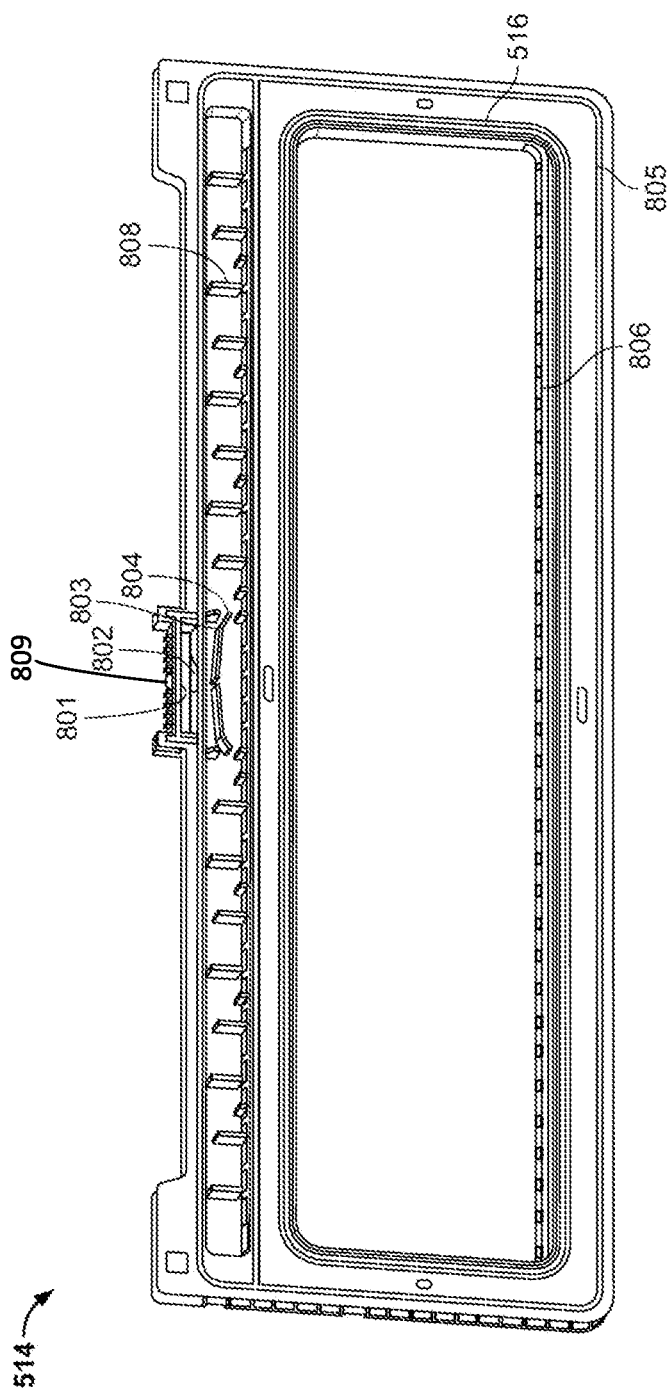
FIG. 9 is a front view of a battery frame member for use in the battery of FIG. 6.

The width and the height of the battery frame member 514 are positioned complementary to the width "W" and the height "H", respectively, of the carbon material 624. The width of the battery frame member 514 is the dimension along (parallel to) the bottom of the battery frame member 514, with the gas channel 801 located at the top of the battery frame member 514 (as illustrated in FIG. 9). In the X-Y-Z coordinate space illustrated in FIG. 7, the width dimension of the battery frame member 514 is in the X direction, while the height dimension of the battery frame member 514 is in the Y direction. The depth of the battery frame member 514 is in the Z direction and is the value of the dimension that is perpendicular to the height and the width of the battery frame member 514 (illustrated in FIG. 7 as "D").

In some embodiments, the ratio of the carbon material height to the battery frame member depth is in the range of from about 4:1 to about 20:1. As shown in the EXAMPLES below, the inventors of the present application have found that battery performance is unexpectedly increased with decreasing ratios as defined above.

2. Terminal Assembly

Another aspect of the electrochemical battery described herein is a terminal assembly. Referring to FIG. 8, a terminal assembly 504 described herein has a terminal connector 708; a conductive flat-plate 704 with an electrically conducting perimeter 706; an electrically insulating tape member 710; and a terminal bipolar electrode plate 702. The conductive flat-plate 704, the terminal bipolar electrode plate 702 and the electrically insulating tape member 710 each have inner and outer surfaces at least substantially parallel with each other, wherein the outer surface of the conductive flat-plate 704 is joined to the terminal connector 708, the inner surface of the conductive flat-plate 704 is joined to the outer surface of the terminal bipolar electrode plate 702, with the electrically insulating tape member 710 being disposed between the inner surface of the conductive flat-plate 704 and the outer surface of the bipolar electrode plate 702 such that the electrically insulating tape member 710 does not cover the entire inner surface area of the conductive flat-plate 704, and wherein the electrically conducting perimeter 706 enables bi-directional uniform current flow through the conductive flat-plate 704 between the terminal connector 708 and the terminal bipolar electrode plate 702.

Since the insulating tape member 710 does not cover entire surface of the conductive flat-plate 704, it permits the electrically conducting perimeter 706 to be in electrical communication with the terminal bipolar electrode plate 702. In some embodiments, the dimensions of the insulating tape member 710 is smaller than the dimensions of the conductive flat-plate 704. The terminal connector 708 of the bipolar electrochemical battery is connected for electrical communication with the conductive flat-plate 304. In some embodiments, the outer surface of the conductive flat-plate 704 is joined to the terminal connector 708. In some embodiments, the terminal connector 708 comprises any electrically conducting material. In one embodiment, the terminal connection comprises brass (e.g., the terminal connector is a tab assembly that electrically communicates or contacts the terminal perimeter).

The terminal bipolar electrode plate 702 of the terminal assembly 504 has inner and outer surfaces at least substantially parallel with the inner and outer surfaces of the conductive flat-plate 704 and electrically insulating tape member 710. The terminal bipolar electrode plate 702 may comprise, without limitation, a titanium material that is coated with a titanium carbide material, thru holes, rough inner surface, or the like. The electrically conducting perimeter 706 of the flat-plate 704 with electrically insulating tape member 710 joins to the terminal bipolar electrode plate 702 such that the electrically conducting perimeter 706 is approximately centered about the electrochemically active region of the terminal bipolar electrode plate 702. In some embodiments, the electrochemically active region corresponds to a region extending between the inner and outer surfaces of the terminal bipolar electrode plate 702 in chemical or electrical communication with the adjacent bipolar electrode plate during charge and discharge cycles of the electrochemical battery. In these embodiments, the electrochemically active region for the terminal bipolar electrode plate 702 associated with the cathode terminal of the battery corresponds to or is defined by an area enclosed by a cathode assembly disposed upon the inner surface of the terminal bipolar electrode plate 702 (e.g., the terminal cathode electrode plate). The electrochemically active region for the terminal bipolar electrode plate 702 associated with the anode terminal of the battery may correspond to an area on its inner surface that opposes a cathode assembly disposed on the front surface of an adjacent bipolar electrode plate and forms a layer of zinc metal upon charging of the battery (terminal anode assembly). In some embodiments, at least a portion of the surface (e.g., at least the chemically active region) of the terminal bipolar electrode plate 702 of the terminal anode assembly is a rough surface.

FIG. 8 provides an exploded view of a terminal assembly for use in the battery of FIG. 6 showing the cathode carbon material 624, the adhesive layer 711, the terminal bipolar electrode plate 702, the electrically insulating tape member 710, the conductive flat-plate 704, the electrically conducting perimeter 706, and the terminal connector 708.

In some embodiments, the electrically conducting perimeter 706 formed by welding is centered within the electrochemically active region of the terminal bipolar electrode plate 702. In some embodiments, the electrically conducting perimeter 706 is substantially rectangular, substantially circular or substantially elliptical. In some embodiments, the electrically conducting perimeter 706 is substantially rectangular.

In some embodiments, the conductive flat-plate 704 with electrically insulating tape member 710 is centered within the electrochemically active region of the terminal bipolar electrode plate 702.

In some embodiments, the surface of the electrically insulating tape member is joined to the surface of the conductive flat-plate by a weld or an adhesive. In some embodiments, the adhesive is electrically conductive.

The conductive flat-plate described herein is larger than prior art current aggregators, and hence, it provides more contact points and better current density distribution. This reduces manufacturing costs.

In some embodiments, the terminal assembly is a terminal cathode assembly, wherein the terminal cathode assembly comprises a terminal bipolar electrode plate 702 having an electrochemically active region, a conductive flat-plate 704 with electrically insulating tape member 710 disposed on the surface of the terminal bipolar electrode plate 702 and approximately centered in the electrochemically active region, and a cathode assembly such as any of the cathode assemblies described herein disposed on the inner surface of the terminal bipolar electrode plate 702.

In some embodiments, the terminal assembly is a terminal anode assembly, wherein the terminal anode assembly comprises a terminal bipolar electrode plate 702 having an electrochemically active region, a conductive flat-plate 704 with electrically insulating tape member 710 centered in the electrochemically active region, and wherein the terminal anode assembly lacks a cathode assembly.

In some embodiments, the electrically conducting perimeter 706 of the conductive flat-plate 704 with electrically insulating tape member 710 is joined to the surface of the terminal bipolar electrode plate 702 by a weld or an adhesive. In some instances, the adhesive is electrically conductive. Non-limiting examples of suitable electrically conductive adhesives include graphite filled adhesives (e.g., graphite filled epoxy, graphite filled silicone, graphite filled elastomer, or any combination thereof), nickel filled adhesives (e.g., nickel filled epoxy), silver filled adhesives (e.g., silver filled epoxy), copper filled adhesives (e.g., copper filled epoxy), any combination thereof, or the like.

In some embodiments, the conductive flat-plate 704 with electrically insulating tape member 710 is composed of at least one of a copper alloy, a copper/titanium clad, aluminum, titanium, and electrically conductive ceramics.

In some embodiments, at least one of the conductive flat-plate 704 with electrically insulating tape member 710 or the terminal bipolar electrode plate 702 comprises titanium. In some embodiments, at least one of the conductive flat-plate 704 with electrically insulating tape member 710 or the terminal bipolar electrode plate 702 comprises a titanium material coated with a titanium carbide material.

In some embodiments, the inner surfaces of at least one of the conductive flat-plate 704 with electrically insulating tape member 710 comprises copper.

In some embodiments, the outer surface of at least one of the conductive flat-plate 704 with electrically insulating tape member 710 comprises at least one of copper, titanium, and electrically conductive ceramics.

In some embodiments, the conductive flat-plate 704 with electrically insulating tape member 710 comprises a first metal and the terminal bipolar electrode plate 702 comprises a second metal.

In some embodiments, the electrically insulating tape member 710 may be comprised of any adhesive material that is electrically insulating in nature. Non-limiting examples of the electrically insulating tape member 710 include, for example, Kapton™, Mylar™, polyimide, polyethylene, nylon, Teflon, neoprene, or any other electrically insulating polymer.

3. Battery Frame Members

In some embodiments, the battery described herein has a battery frame member 514 that is interposed between two adjacent bipolar electrodes or interposed between a bipolar electrode 502 and a terminal assembly 504 (e.g., a terminal anode assembly or a terminal cathode assembly).

As noted above, the width and the height of the battery frame member 514 are positioned complementary to the width "W" and the height "H", respectively, of the carbon material 624. Width of the battery frame member 514 is the dimension along (parallel to) the bottom of the battery frame member 514, with the gas channel 801 located at the top of the battery frame member 514 (as illustrated in FIG. 9). In the X-Y-Z coordinate space illustrated in FIG. 7, the width dimension of the battery frame member 514 is in the X direction, while the height dimension of the battery frame member 514 is in the Y direction. In some embodiments, the battery frame member 514 is substantially rectangular, with the width being visibly greater than the height so as to convey a rectangular appearance.

In one embodiment, illustrated in FIG. 9, the battery frame member 514 has an outer periphery edge, and an inner periphery edge defining an open interior region. In some embodiments, the battery frame member 514 is configured such that open interior region is approximately centered about the center of an electrochemically active region of a terminal bipolar electrode plate 702 received by the battery frame member 514 and/or the center of a cathode assembly disposed on a terminal bipolar electrode plate 702. In some embodiments, the outer periphery of the battery frame member 514 defines the outer surface of a battery.

In some embodiments, the battery frame member 514 includes a first side that opposes and retains the first (terminal) bipolar electrode plate 702 and a second side disposed on an opposite side of the battery frame member 514 than the first side that opposes and retains a second bipolar electrode plate. The second electrode plate is adjacent and parallel to the first electrode plate in the battery. The first and second electrode plates and the terminal electrode plate(s) may be configured to have substantially the same size and shape. In some embodiments, the battery frame member 514 is in contact with an anode bipolar electrode plate on one side and a cathode bipolar electrode plate of the adjacent bipolar cell on the other side.

In some embodiments, the battery frame member 514 includes a sealing member 516 (FIG. 9) that extends around the inner periphery edge of the entire frame. In some embodiments, the battery frame member 514 comprises a first sealing member 516 disposed along the first inner periphery edge. In some embodiments, the first sealing member is an O-ring. In some embodiments, the first sealing member 516 is a gasket. In some embodiments, each inner periphery edge is configured to receive a sealing member 516 seated therein that forms a substantially leak-free seal when the seal is compressed between the corresponding bipolar electrode plate or terminal electrode plate and the battery frame member 514 when the electrochemical battery is assembled to provide a sealing interface between the bipolar electrode plate or endplate and the battery frame member 514. The sealing members cooperate to retain the electrolyte between the opposing bipolar electrode plates and a battery frame member 514, or between a bipolar electrode plate, a terminal electrode plate and a frame member 514. In some embodiments the sealing member 516 is overmolded onto the frame member 514. In some embodiments, the sealing member 516 is applied to the frame member 514 using a form in place liquid curing process. In some embodiments, the sealing member 516 extends above the depth of the frame member 514 and is compressed during assembly.

In some embodiments, the battery frame member 514 comprises a gutter in the bottom portion of the battery frame member 514 to prevent voltage anomalies during cycling. In some embodiments, the gutter comprises a gutter shelf 406 and a void space 407 underneath the gutter shelf 406. In some embodiments, the cathode carbon material 624 rests on the gutter shelf 406. It has been found that the presence of the gutter shelf and the void underneath the gutter shelf prevent voltage anomalies during cycling. In some embodiments, there is no void space 407 underneath the gutter shelf 406 and the gutter shelf 406 extends to the bottom of the battery frame member 514. In some embodiments, the gutter shelf 406, upon which the cathode carbon material 624 rests, may be between 0.5 and 5 cm tall, including void space 407 under gutter shelf 406, and may be between 3 and 10 mm wide along the entire bottom portion of the battery frame member 514 width.

In some embodiments, the battery frame member comprises a first frame member and a second frame member. In some embodiments, the first frame member and the second frame member are horizontally stacked and vertically oriented, wherein a first outer edge of the first frame member is substantially coplanar with a second outer edge of the second frame member.

In some embodiments of a battery, each battery frame member 514 is plastic welded to the adjacent battery frame member 514 using a weld bead 805 around the perimeter of the battery frame member 514.

In some embodiments, the battery frame member 514 comprises a gas channel 801 on the top of the battery frame member 514 directly above a ventilation hole 802. The ventilation hole 802 allows gas to escape from the frame member 514 into the gas channel 801. In some embodiments, unlike the gas channel 401 in the embodiment of battery 100, the gas channel 801 associated with each battery frame member 514 is covered, so there is no need to place a cover over the gas channel 801 after the battery frame members are assembled together. As described herein, the gas channel 801 is the battery headspace for the gases from the electrochemical cell in the battery frame member 514. In some embodiments, unlike the ventilation hole 402 in the embodiment of battery 100 (where the electrolyte is added to the battery through the ventilation hole), the frame members 514 are filled with electrolyte through a fill hole (plug 809 is inserted therein as illustrated) in the gas channel and the gas channel 801 also communicates with the ventilation hole 802. Once the battery is filled with electrolyte, a plug 809 is inserted into the fill hole to seal the gas channel 801 from the environment. In those embodiments where the fill hole and the ventilation hole 802 are not the same, the ventilation hole remains open to the gas channel during battery operation.

In some embodiments, a liquid diversion system exists in the top of the battery frame member 514 directly below the ventilation hole 802 which allows gas to escape into a gas channel 801. While the gas channel 801 provides gas communication throughout the battery 500, the liquid diversion system prevents liquid from entering the gas channel 801 via a series of features. In some embodiments, the liquid diversion system comprises a primary diverter 803 with two partial blocking walls 804 and multiple secondary blocking walls 808 ensuring liquid always is directed back to the open interior region within the battery frame member 514. In some embodiments, the primary diverter 803 consists of a horizontal plastic protrusion with end pieces facing downward with an angle ranging from 30 to 60 degrees. In some embodiments, secondary blocking walls ensure minimum fluid will reach the primary diverter. In some embodiments, unlike the secondary blocking walls 408 in the embodiment of battery 100, the secondary blocking walls 808 herein are designed to alternate top down and bottom up relative to the battery frame member 514 in order to break any internal electrolyte waves caused by severe sloshing or tilting. One of the advantages of the liquid diversion system is that it improves quality of the battery by keeping electrolyte contained within the battery frame member during transportation.

Each battery frame member 514 may be formed from flame retardant polypropylene, high density polyethylene, polyphenylene oxide, polyphenylene ether, polystyrene, or a combination thereof. Each battery frame member 514 may receive two adjacent bipolar electrode plates or a bipolar electrode plate and a terminal electrode plate. Each battery frame member 514 may also house an aqueous electrolyte solution (e.g., zinc-halide electrolyte or zinc-bromide electrolyte), which is received via the ventilation hole 802.

A close-up side-view of the bottom portion of the battery frame member 514 is substantially similar to FIG. 5 illustrated with respect to the battery frame member 114 in the embodiment of battery 100. With respect to the battery frame member 514, the corresponding gutter shelf may be designated reference numeral 806 and the corresponding void space may be designated reference numeral 807, which is under the gutter shelf 806. In this embodiment, each battery frame member 514 within the battery contains the gutter shelf 806 and void space 807.

4 Zinc-Halide Electrolyte

The zinc-halide electrolyte is described in U.S. Pat. No. 10,305,111, which is hereby incorporated by reference in its entirety.

III. EXAMPLES

Figure 11:
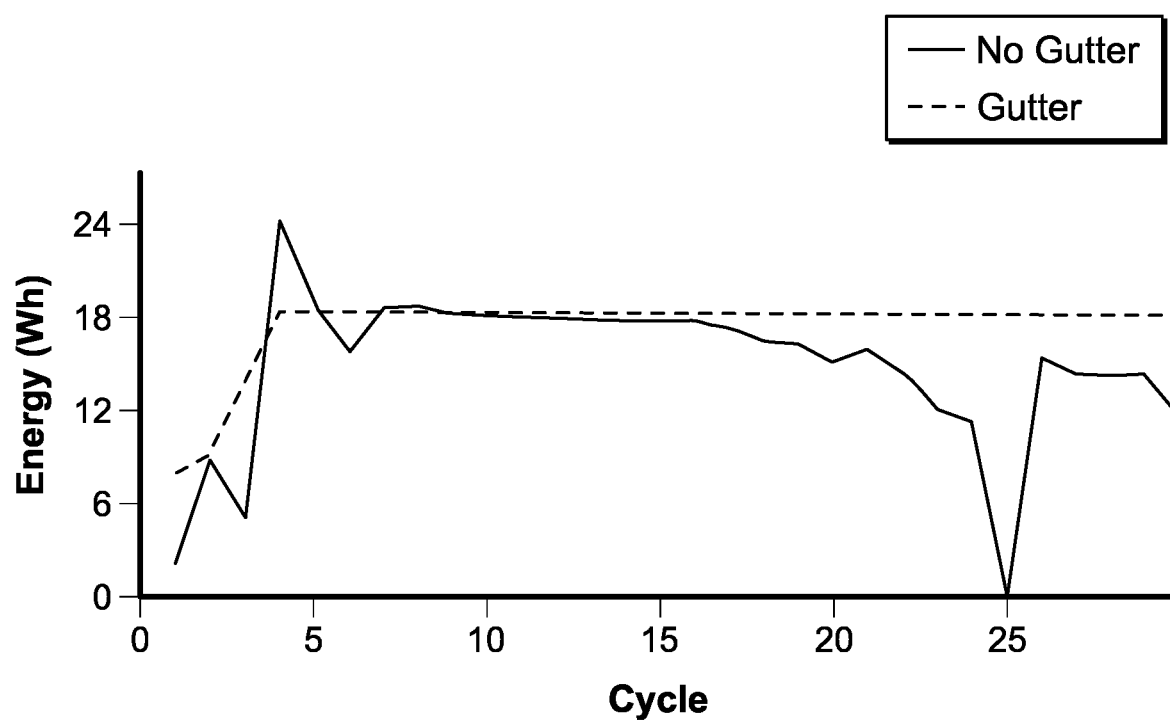
FIG. 11 shows representative discharge energy data for batteries utilizing a gutter according to an embodiment in the present disclosure.

FIG. 11 shows the results of battery testing with frame members containing the gutter shelf and a void space compared to a control with no gutter shelf or void space. The results show discharge energy as a function of cycle number where the batteries cycled with the gutter shelf and a void space incorporated into the battery frame member greatly improve the voltage stability of the battery and in turn, the discharge energy and cycle life of the battery.

Figure 12:
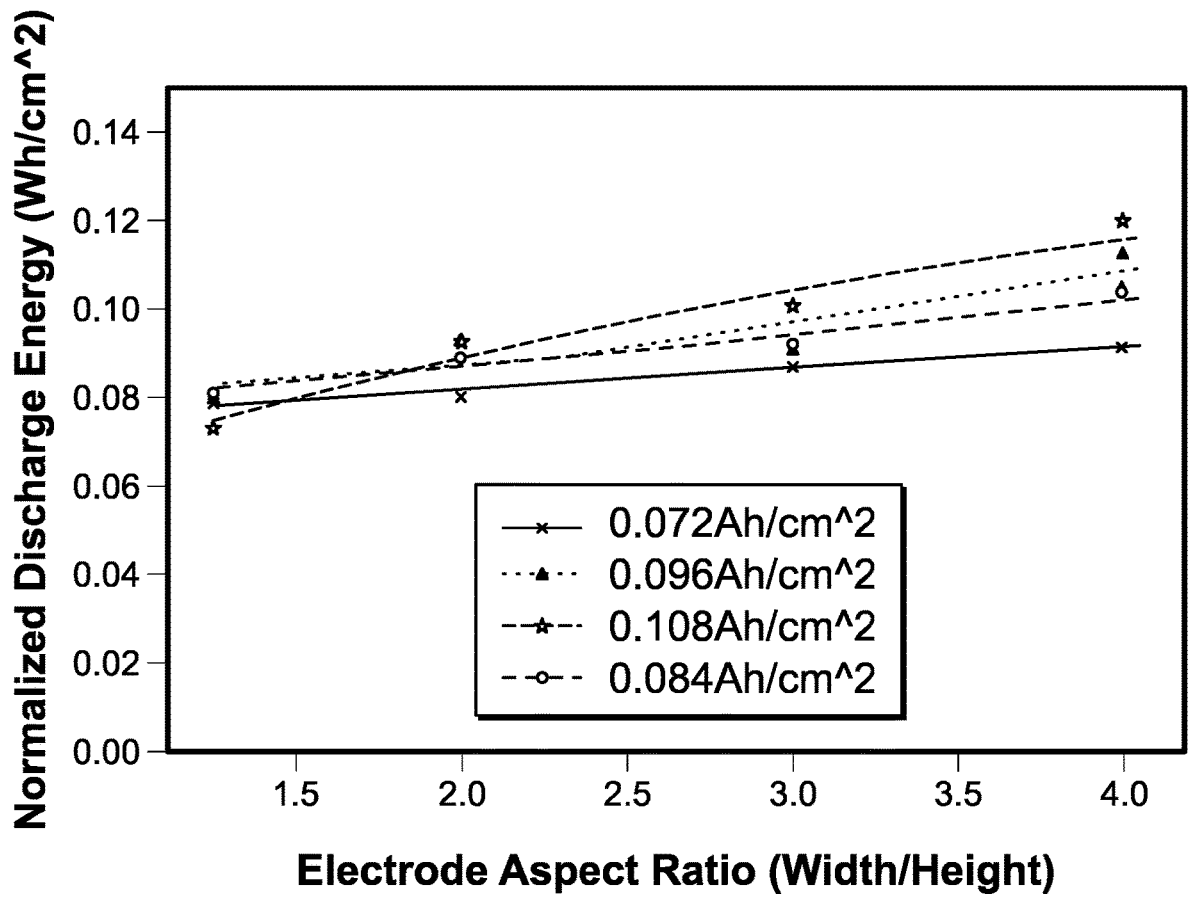
FIG. 12 shows representative discharge energy data at various normalized charge capacities ($Ah/cm^2$, where $cm^2$ is the geometric area of the carbon material) as a function of carbon material aspect ratio according to embodiments in the present disclosure.

FIG. 12 shows the results of battery testing with carbon material of varying aspect ratios (ratio of width to height), where total geometric area of the carbon material was held constant across each different aspect ratio tested. The results show normalized discharge energy as a function of aspect ratio at various normalized charge capacities (Ah/cm$^2$, where cm$^2$ is the geometric area of the carbon material) where the normalized discharge energy is unexpectedly greater with increasing aspect ratio. This result is seen at all normalized charge capacities.

Figure 13:
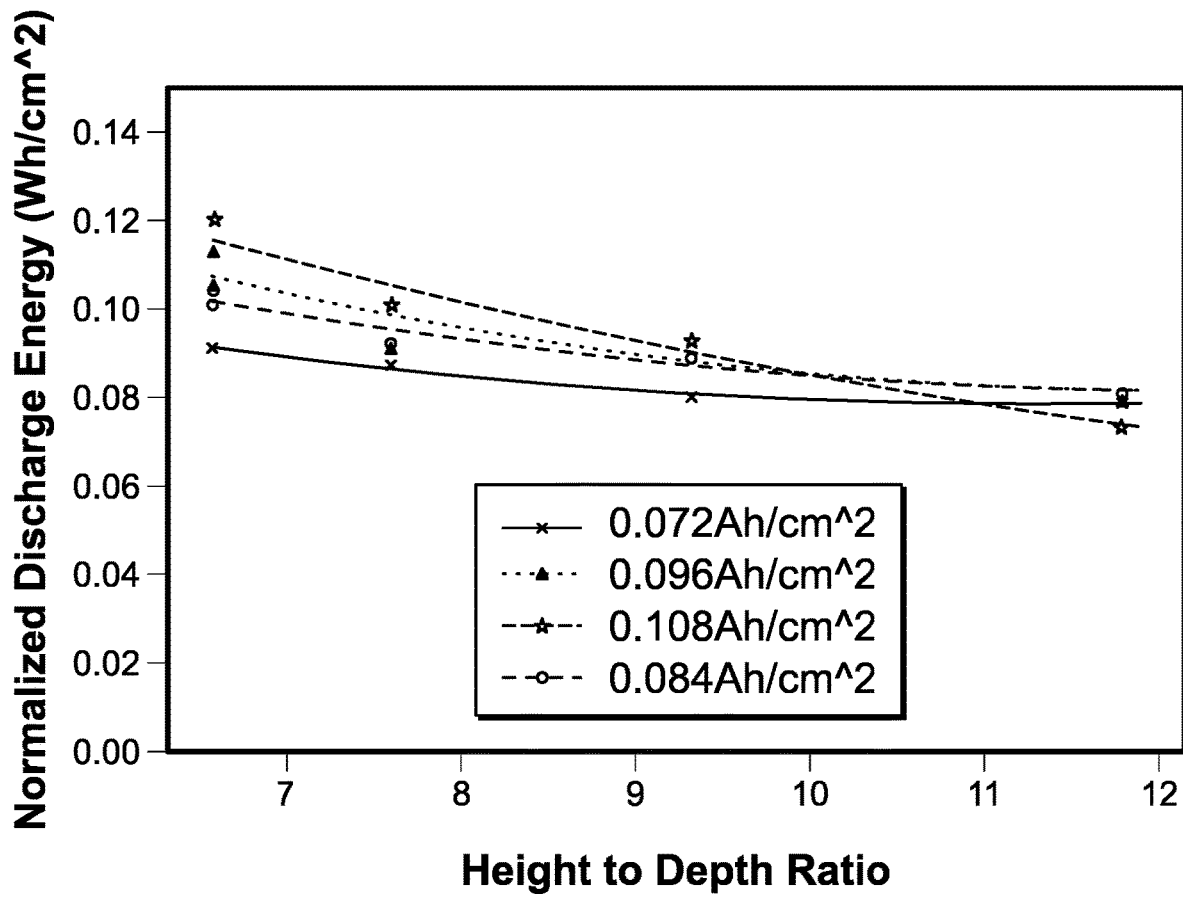
FIG. 13 shows representative discharge energy data at various normalized charge capacities ($Ah/cm^2$, where $cm^2$ is the geometric area of the carbon material) as a function of carbon material height to frame depth ratio according to embodiments in the present disclosure.

FIG. 13 shows the results of battery testing with carbon material of various height to frame member depth ratios. The results show normalized discharge energy as a function of carbon electrode height to battery frame member depth ratio at various normalized charge capacities (Ah/cm$^2$, where cm$^2$ is the geometric area of the carbon material) where the normalized discharge energy is unexpectedly greater with decreasing height to depth ratios. This result is seen at all normalized charge capacities.

Figure 14:
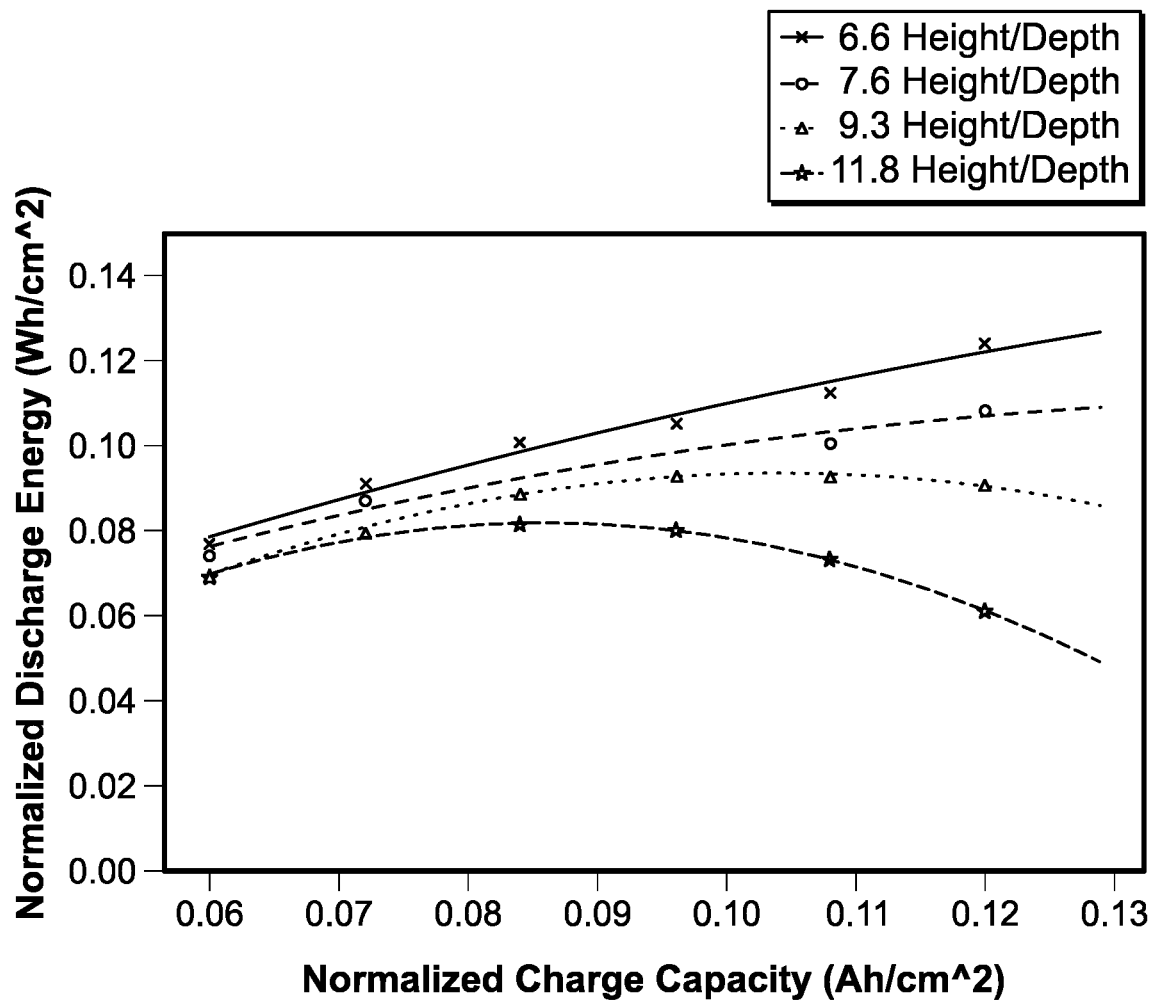
FIG. 14 shows representative discharge energy data of various carbon material height to frame depth ratios as a function of normalized charge capacity ($Ah/cm^2$, where $cm^2$ is the geometric area of the carbon material) according to embodiments in the present disclosure.

FIG. 14 shows the results of battery testing with carbon material of various height to frame member depth ratios. The results show normalized discharge energy as a function of normalized charge capacity (Ah/cm$^2$, where cm$^2$ is the geometric area of the carbon material) at various height to depth ratios where the normalized discharge energy is unexpectedly greater with decreasing height to depth ratios. This result is seen at all normalized charge capacities.

OTHER EMBODIMENTS

It should be apparent that the foregoing relates only to the preferred embodiments of the battery disclosed herein and that numerous changes and modifications may be made herein without departing from the spirit and scope of any invention as defined by the following claims and equivalents thereof.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A battery frame member for a static rechargeable battery comprising:
   a liquid diversion system;
   a gutter;
   a sealing member;
   a gas channel; and
   a ventilation hole,
   wherein the gutter is in a bottom portion of the battery frame member above a bottom portion of the sealing member and the gutter comprises a gutter shelf and a void underneath the gutter shelf, and
   wherein the gas channel is in a top portion of the battery frame member directly above the ventilation hole.

2. The battery frame member of claim 1, wherein the liquid diversion system is in the top portion of the battery frame member directly below the ventilation hole.

3. The battery frame member of claim 2, wherein the liquid diversion system comprises a primary diverter and secondary blocking walls.

4. The battery frame member of claim 3, wherein the secondary blocking walls alternate top down and bottom up relative to the battery frame member.

5. The battery frame member of claim 1, wherein the sealing member extends around an inner periphery edge of the battery frame member.

6. The battery frame member of claim 5, wherein the sealing member either does not extend around a top portion of the inner periphery edge of the battery frame member or the sealing member extends around the inner periphery edge of the entire battery frame member.

7. The battery frame member of claim 1, wherein the gas channel is enclosed.

8. The battery frame member of claim 7, wherein the gas channel is covered by a lid that is attached to the battery frame member by means of welding, gluing, screwing, or snapping the lid to the battery frame member.

9. The battery frame member of claim 1, wherein the gas channel is integrated in the battery frame member.

10. The battery frame member of claim 9, wherein the gas channel is sealed from external environment with a plug.

11. The battery frame member of claim 1, wherein the battery frame member is substantially rectangular.

12. The battery frame member of claim 1, wherein a cathode carbon material rests on the gutter shelf.

* * * * *